United States Patent [19]
Stohlquist

[11] 3,729,894
[45] May 1, 1973

[54] METHOD AND APPARATUS FOR WRAPPING ARTICLES

[75] Inventor: Roger H. Stohlquist, Rockford, Ill.

[73] Assignee: Anderson Bros. Mfg. Co., Rockford, Ill.

[22] Filed: Dec. 2, 1971

[21] Appl. No.: 204,082

[52] U.S. Cl. ..........................53/28, 53/76, 53/182, 156/358
[51] Int. Cl. .........................B65b 9/02, B65b 57/10
[58] Field of Search ......................53/28, 52, 73-76, 53/180, 182; 156/358, 363

[56] References Cited

UNITED STATES PATENTS

| | | | |
|---|---|---|---|
| 3,122,467 | 2/1964 | Hannon | 53/180 X |
| 3,237,371 | 3/1966 | Gerlach | 53/182 |
| 3,453,801 | 7/1969 | Stohlquist | 156/515 X |
| 3,518,808 | 7/1970 | Solomon | 53/180 X |

*Primary Examiner*—Robert L. Spruill
*Attorney*—Vernon J. Pillote

[57] ABSTRACT

A method and apparatus for wrapping articles as they move along an article path in which a plurality of opposed pairs of jaws are moved in spaced succession forwardly along the article path in a sealing run having a length substantially greater than the spacing between adjacent pairs of jaws, articles are advanced through a curtain of the material to a position in front of a pair of jaws adjacent the inlet end of the sealing run for advance therewith along the sealing run, the presence or absence of an article in front of each pair of sealing jaws is sensed as they move along the sealing run, and the sealing jaws are relatively moved toward each other into clamping engagement with the curtain therebetween when an article is present in front of the sealing jaws as they move along the article path and the sealing jaws are moved out of clamping engagement with the web in the absence of an article in front of the sealing jaws, and the curtain of material is retracted when all of the pairs of sealing jaws along the sealing run are out of clamping engagement with the curtain.

25 Claims, 18 Drawing Figures

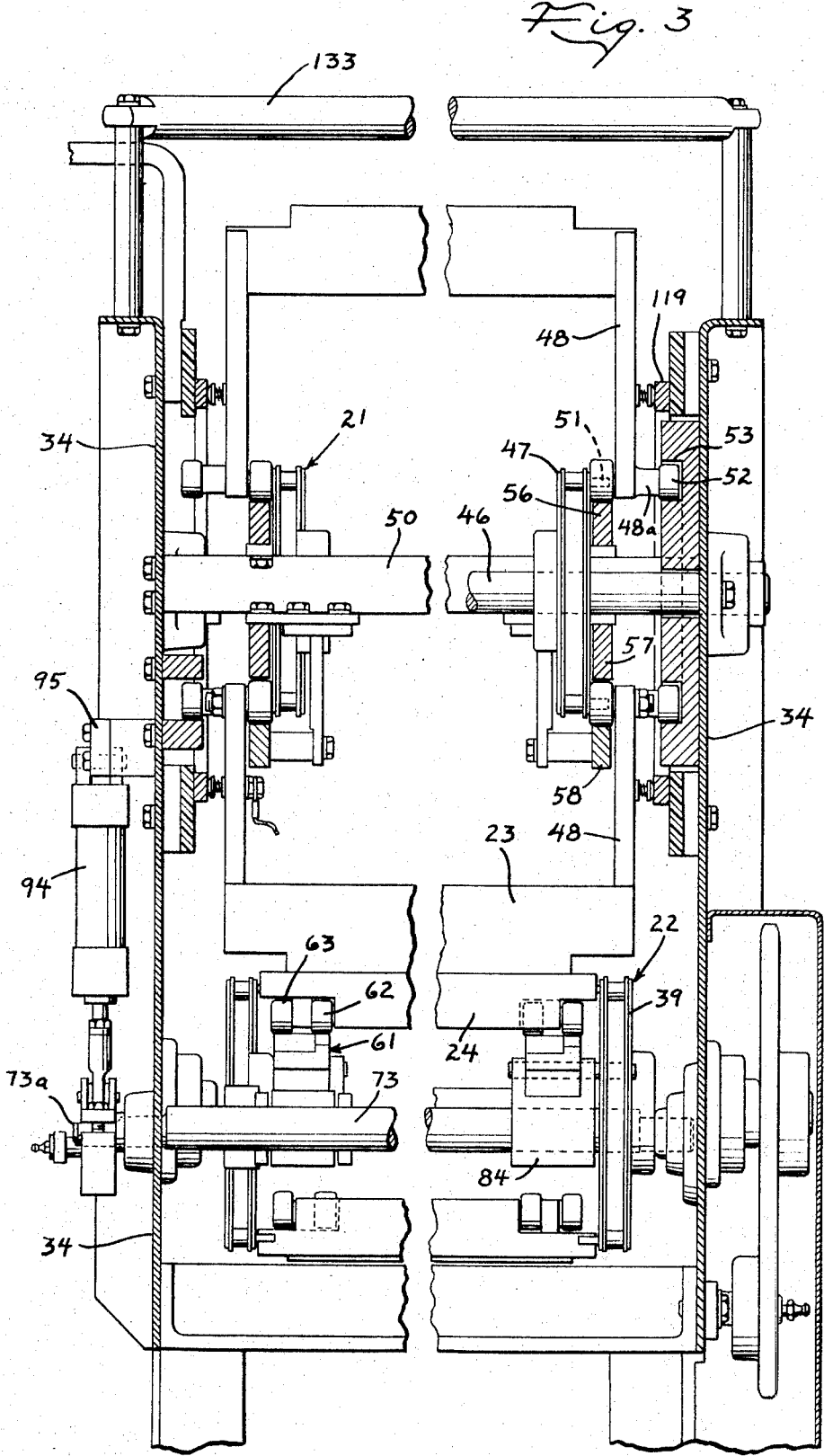

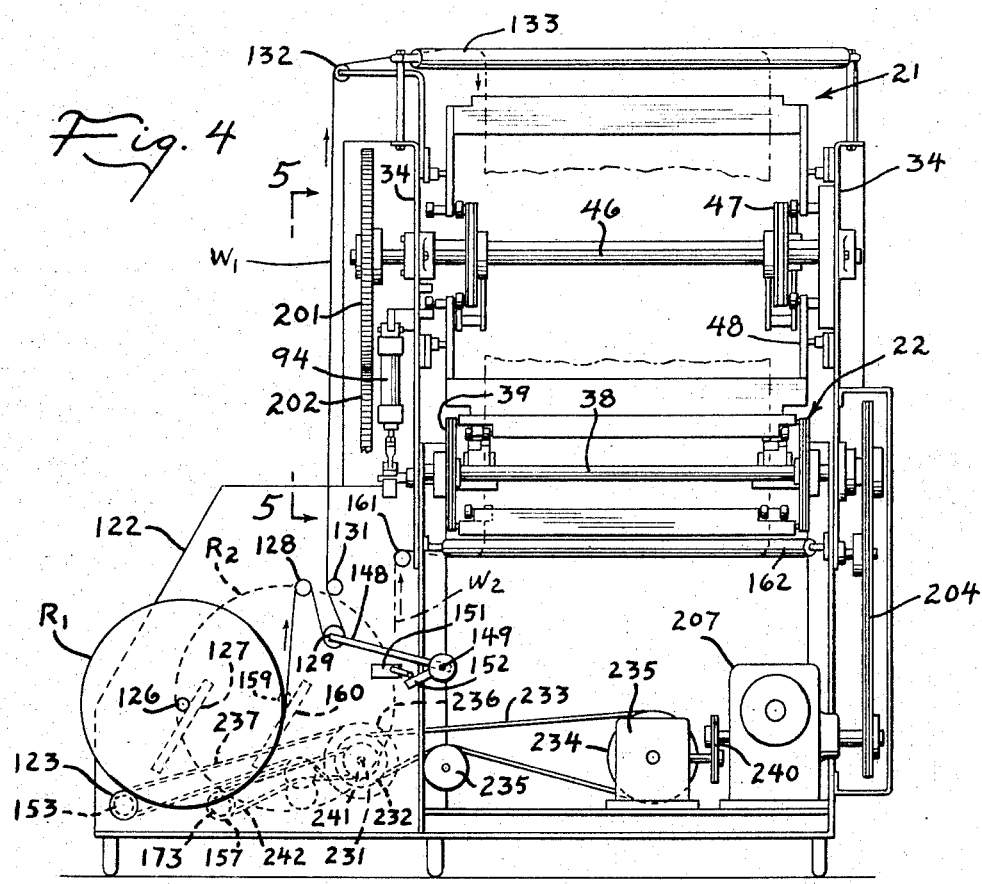
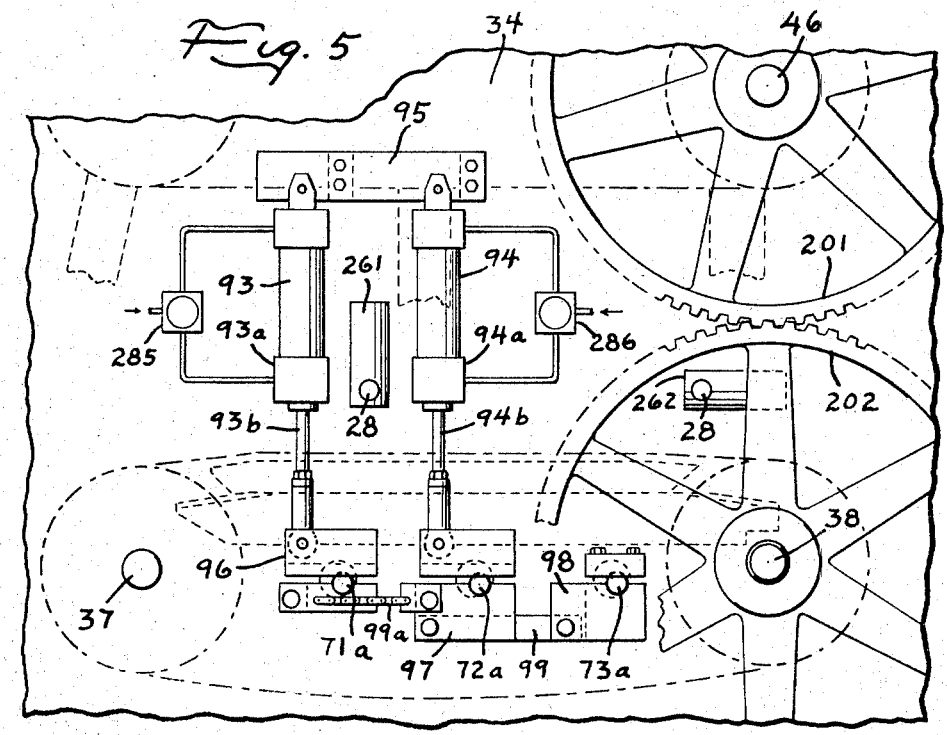

Patented May 1, 1973 3,729,894
11 Sheets-Sheet 9
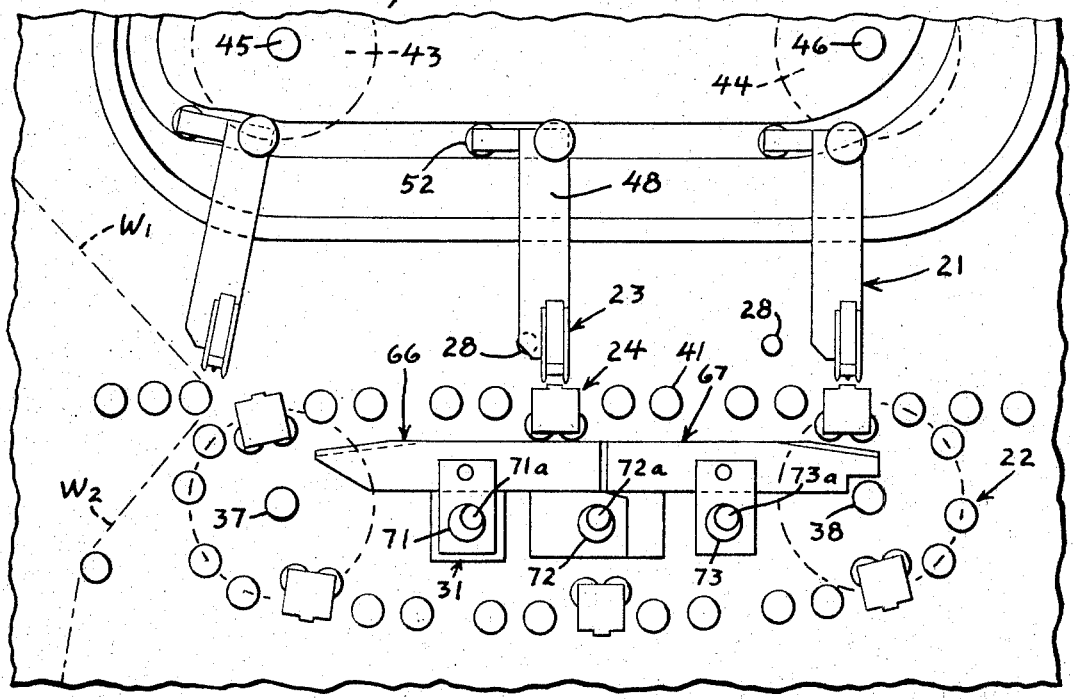
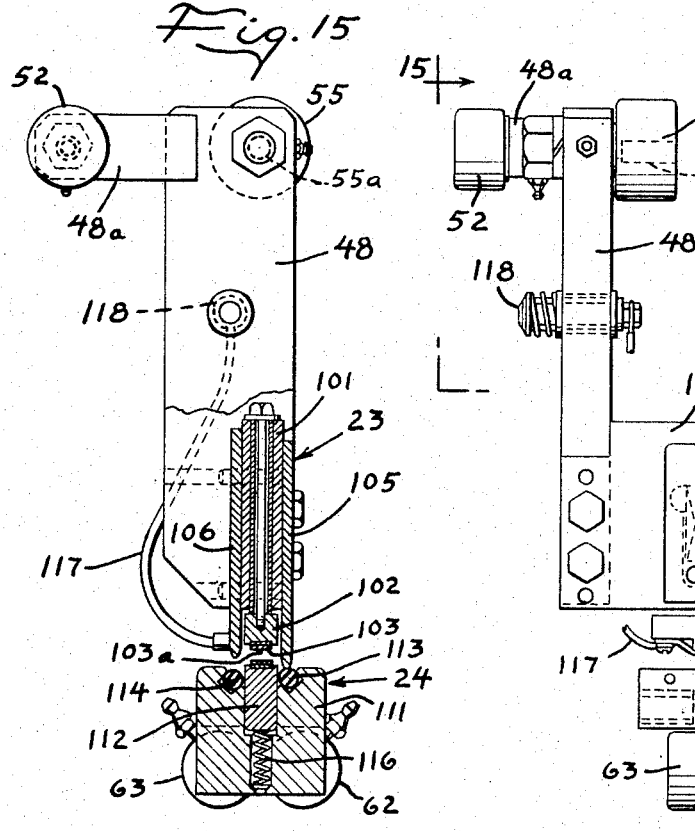
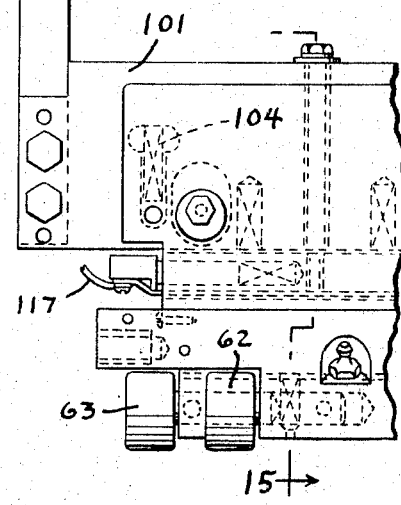

Patented May 1, 1973

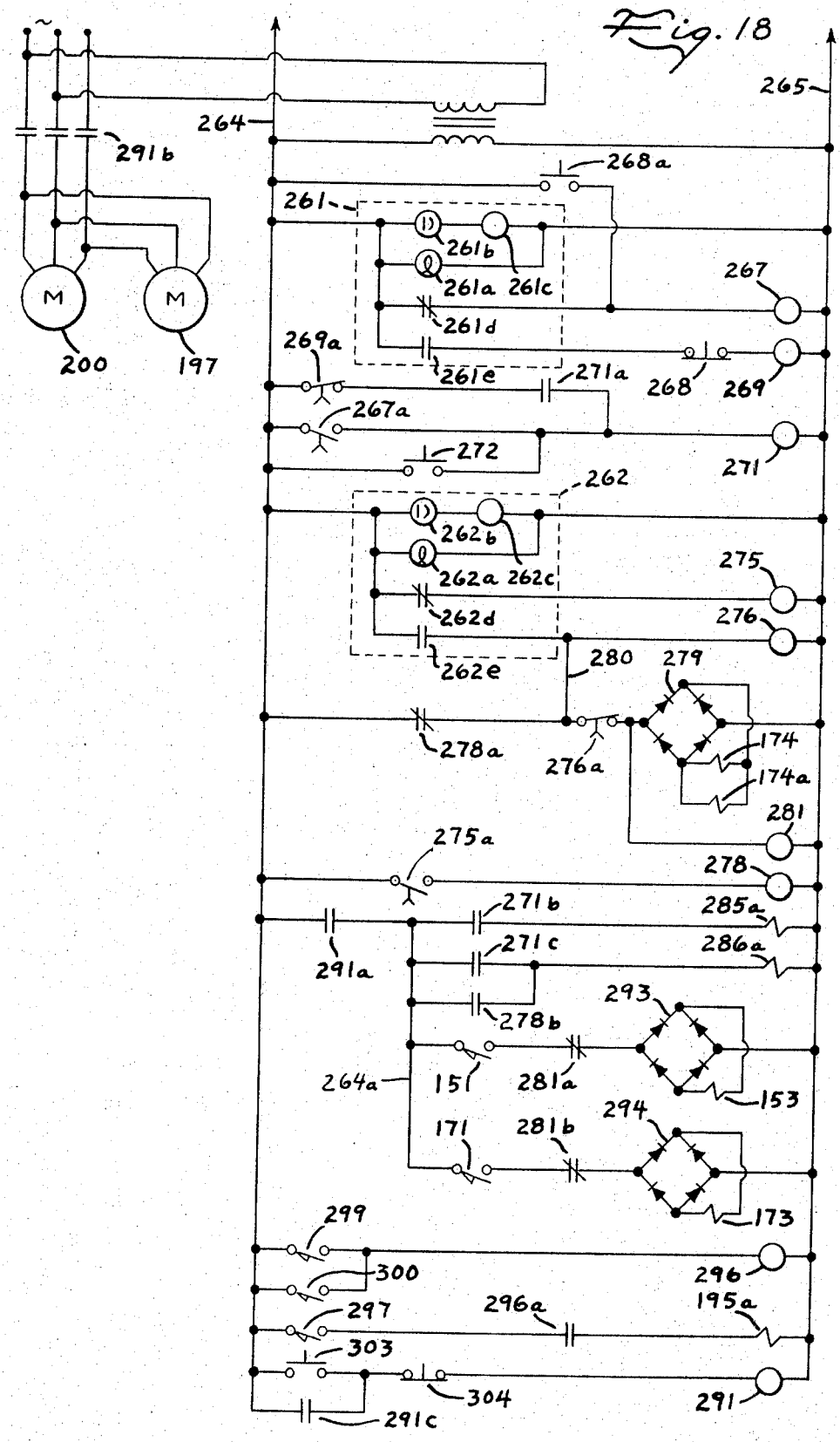

METHOD AND APPARATUS FOR WRAPPING ARTICLES

BACKGROUND OF THE INVENTION

Apparatus has heretofore been made for wrapping articles in a web of heat shrinkable material and for thereafter passing the wrapped articles through a heat tunnel to shrink the film to form a tight wrap around the article. In one form of the prior apparatus, for example as shown in the U. S. Pat. to Monaghan No. 3,158,973, dated December 1, 1964, the articles are intermittently advanced along a path into engagement with one side of a curtain of material extending crosswise of the path to draw the curtain along the lead and around the top and bottom sides of the article. In such apparatus, the web was severed and sealed at the trail side of the article by heat sealing jaws mounted for relative reciprocation in a direction perpendicular to the path, and the arrangement was such that the advance of the article along the path had to be interrupted during closing of the jaws and during severing and sealing of the overlapping portions of the curtain at the trail side of the article. Moreover, in such apparatus, the heat seal joint at the lead side of each article is subject to web tension stresses during closing of the jaws at the trail side of the article.

In another form of article wrapping apparatus disclosed in the U. S. Pat. to Roger H. Stohlquist No. 3,453,801 dated July 8, 1969, articles are advanced along a path into a curtain of material to draw the material along the lead and top and bottom of the articles, and sealing jaws are thereafter moved laterally of the path into a position pressing the curtain against the trail side of the article to draw the curtain closely around the article and the sealing jaws are then moved along the article path to advance the article by pushing engagement therewith during severing and sealing of the webs at the trail side of the article. In that apparatus, the jaws were spaced apart a distance substantially greater than the distance that the jaws were held in clamping engagement with the web so that the web was sealed, severed and released from between one pair of jaws and the web then retracted before a succeeding pair of jaws were moved into sealing position. In this apparatus, the length of the sealing run was limited to a distance less than the spacing between adjacent pairs of sealing jaws so that the joint between the webs at the lead side of the article was subject to web stresses during closing of the sealing jaws at the trail side of the article. Moreover, the web was retracted after each sealing operation and this limited the maximum speed at which the above-mentioned machine can be operated since the sealing jaws had to be maintained in clamping engagement with the web for a time sufficient to sever and heat seal the web at opposite sides of the line of severance and also allow the seal joint to cool sufficient to take the stress incident to retraction of the web against a succeeding article.

In still another form of article wrapping apparatus, for example as shown in U. S. Pat. to Peppler No. 3,206,588, dated Sept. 14, 1965, articles are positioned at spaced locations between upper and lower webs of heat sealable material and the webs are then sealed at spaced points intermediate the spaced articles and the webs severed at the point of sealing to separate the articles. This apparatus, however, is such that it would continue to advance the upper and lower webs and to seal and sever the webs at spaced locations therealong, even in the absence of an article fed into position between the webs. This would produce an objectionable waste of material in the absence of articles advanced to the wrapping apparatus and, moreover, the waste wrapping material would tend to foul not only the wrapping apparatus but also any subsequent heat shrink apparatus.

SUMMARY OF THE INVENTION

The present invention relates to a method and apparatus for wrapping articles in two webs of heat sealable material wherein a plurality of opposed pairs of jaws are advanced in spaced succession forwardly along an article path in a sealing run having a length substantially greater than the spacing between adjacent pairs of jaws so that a pair of jaws moves into clamping engagement with overlapping portions of the two webs at the trail side of an article before the pair of jaws at the lead side of the article move out of clamping engagement with the webs to avoid stressing of the joint between the webs at the lead side of an article while clamping and sealing the webs at the trail side of the article. Articles are advanced along an article path through a curtain formed by the webs to a position in front of a pair of jaws adjacent the inlet end of the sealing run for advance therewith along the sealing run; the advance of articles to a position in front of each pair of jaws in sensed, and the jaws are relatively shifted as they move along the sealing run to either clamp overlapping portions of the curtain between opposed pairs of jaws when an article is advanced in front of that pair of jaws or to avoid clamping overlapping portions of the curtain therebetween when no article is advanced to a position in front of that pair of jaws, and the curtain is retracted only when all of the pairs of jaws along the sealing run are out of clamping engagement with the curtain to prevent waste of wrapping material when articles are not being advanced for wrapping. Relative movement of the jaws is advantageously effected by guides which guide the opposed pairs of jaws along the sealing run and by relatively moving the guides to cause the sealing jaws to either clamp overlapping portions of the web therebetween or to release overlapping portions of the web in accordance with the presence or absence of an article in front of the pair of sealing jaws as they move along the sealing run. The sealing jaws are released from clamping engagement with the web at the outlet end of the sealing run and the curtain is retracted only in the absence of an article in front of the succeeding pairs of sealing jaws along the sealing run to a position adjacent the inlet end of the sealing run. Retraction of the web is advantageously delayed for time after the sealing jaws are released at the outlet end of the sealing jaws, for a time sufficient to allow the heat seal joint between the webs to cool and achieve adequate strength to withstand rupture during retraction.

Various objects of this invention are to provide a method and apparatus for wrapping articles in two webs of heat sealable material which enables wrapping articles in the material at high speeds; which draws the webs of wrapping material around the articles and seals and severs the webs adjacent the trail sides of the articles while they are in motion along the article path, wherein sealing and severing of the web occurs along a sealing run having a length substantially greater than the length of the articles so that overlapping portions of the webs are clamped together between opposed jaws at the trail side of an article before release of the web between opposed jaws at the lead side of the article to avoid stressing of the joint between the webs at the lead side of the article during clamping and sealing of the webs at the trail side of the article; which does not consume any wrapping material or produce any waste in the event no articles are advanced into sealing position; and which effects a relatively close wrap of material around the articles.

These, together with other objects and advantages of this invention will be more readily understood by reference to the following detailed description when taken in connection with the accompanying drawings wherein:

FIG. 3 is a vertical sectional view taken on the plane 3—3 of FIG. 1 and showing the parts on a larger scale;

FIG. 4 is a rear elevational view taken on the plane 4—4 of FIG. 1;

FIG. 5 is a fragmentary side view taken on the plane 5—5 of FIG. 4;

FIGS. 6–13 are fragmentary vertical sectional views taken on the plane 6—6 of FIG. 4 and illustrating the wrapping apparatus in different moved positions;

FIG. 14 is a fragmentary elevational view of one end portion of a sealing jaw assembly;

FIG. 15 is a partial sectional view taken on the plane 15—15 of FIG. 14 through the sealing jaw assembly;

FIG. 18 is a schematic wiring diagram illustrating the controls for the wrapping apparatus.

Figure 1:
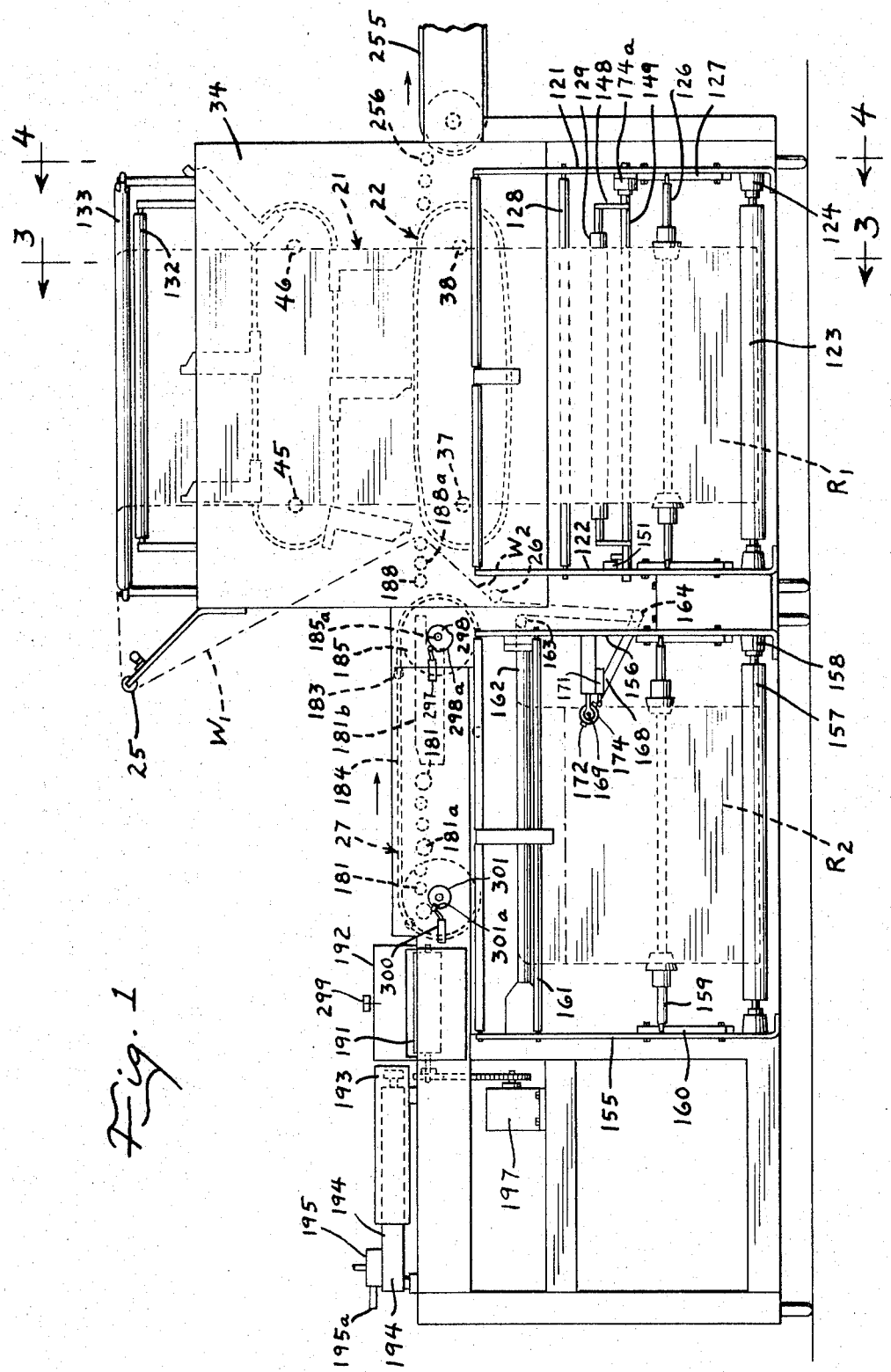
FIG. 1 is a side elevational view of a wrapping apparatus embodying the present invention.

The method and apparatus of the present invention are generally arranged to wrap articles in two webs of material which are fusible in the presence of heat, commonly referred to as heat sealable material. Various different thermoplastic film can be used such as polyethylene, polyvinyl chloride, polypropylene, etc. and, preferably, the webs of heat sealable material are of the heat shrinkable films. When heat shrinkable films are employed, the article is first wrapped in the film and the article is thereafter subjected to heated air for example in a heat tunnel to shrink the film into tight conformity with the article. As used herein, the term articles can comprise a single item or a number of items arranged in a group, with or without additional means for holding the items in a group.

In the method of the present invention, articles are wrapped in two webs of heat sealable material by advancing a plurality of opposed pairs of jaws in spaced succession forwardly along an article path in a sealing run having a length greater than the spacing between adjacent pairs of sealing jaws so that a pair of jaws moves into clamping engagement with the overlapping portions of the webs at the trail side of an article as it moves along the article path before a preceding pair of jaws is moved out of clamping engagement with the webs at the lead side of the article to avoid stressing of the joint between the webs at the lead side of the article during clamping of the jaws at the trail side of the article. Articles are advanced along the article path into a curtain formed by the webs to draw the curtain along the top and bottom of the article and to position the article in front of a pair of sealing jaws adjacent the inlet end of the sealing run for advance therewith along the sealing run. The presence or absence of an article in front of each pair of sealing jaws is sensed as they move along the sealing run and the sealing jaws of a pair are relatively moved toward each other into clamping engagement with the curtain when an article is present in front of that pair of sealing jaws and the sealing jaws are relatively moved away from each other out of clamping engagement with the curtain in the absence of an article in front of that pair of sealing jaws. The overlapping portions of the curtain are severed and sealed along opposite sides of the severance while clamped between the sealing jaws, and the curtain is retracted when all the pairs of the sealing jaws along the sealing run are out of clamping engagement with the curtain. The sealing jaws are guided during movement along the sealing run and relative movement of the sealing jaws into and out of clamping engagement with the curtain is effected by shifting of the guides.

The wrapping apparatus in general includes upper and lower endless conveyors 21 and 22 each having a plurality of sealing jaws 23, 24 at spaced locations therealong and arranged to have the adjacent sections thereof extend forwardly along an article path in a sealing run having a length greater than the spacing between adjacent sealing jaws and with the sealing jaws on the upper and lower conveyors disposed in opposed pairs as they move along the sealing run. Means 25, 26 (FIG. 1) are provided to support end sections of upper and lower webs $W_1$ and $W_2$ respectively above and below the article path, the ends of which webs have previously been joined to form a curtain extending crosswise of the article path, and an inlet conveyor means 27 is provided for advancing articles A along the article path into the curtain to draw the curtain along the top and bottom of the article and to position the article in front of a pair of sealing jaws as they move toward the inlet end of the sealing run. Article sensing means 28 are provided for sensing the presence or absence of an article in front of the pairs of sealing jaws as they move along the sealing run, and a jaw operating means is provided for relatively moving the sealing jaws into a position clamping the overlapping portions of the web therebetween, when an article is present in front of a pair of sealing jaws, the jaw operating means operating to move the sealing jaws out of clamping engagement with the web in the absence of an article in front of that pair of sealing jaws. The sealing jaws 23 and 24 have means for severing and sealing the curtain along opposite sides of the severance when the curtain is clamped between the pairs of sealing jaws and apparatus is provided for retracting the curtain when all of the sealing jaws along the sealing run are out of clamping engagement with the curtain of material.

Figure 6:
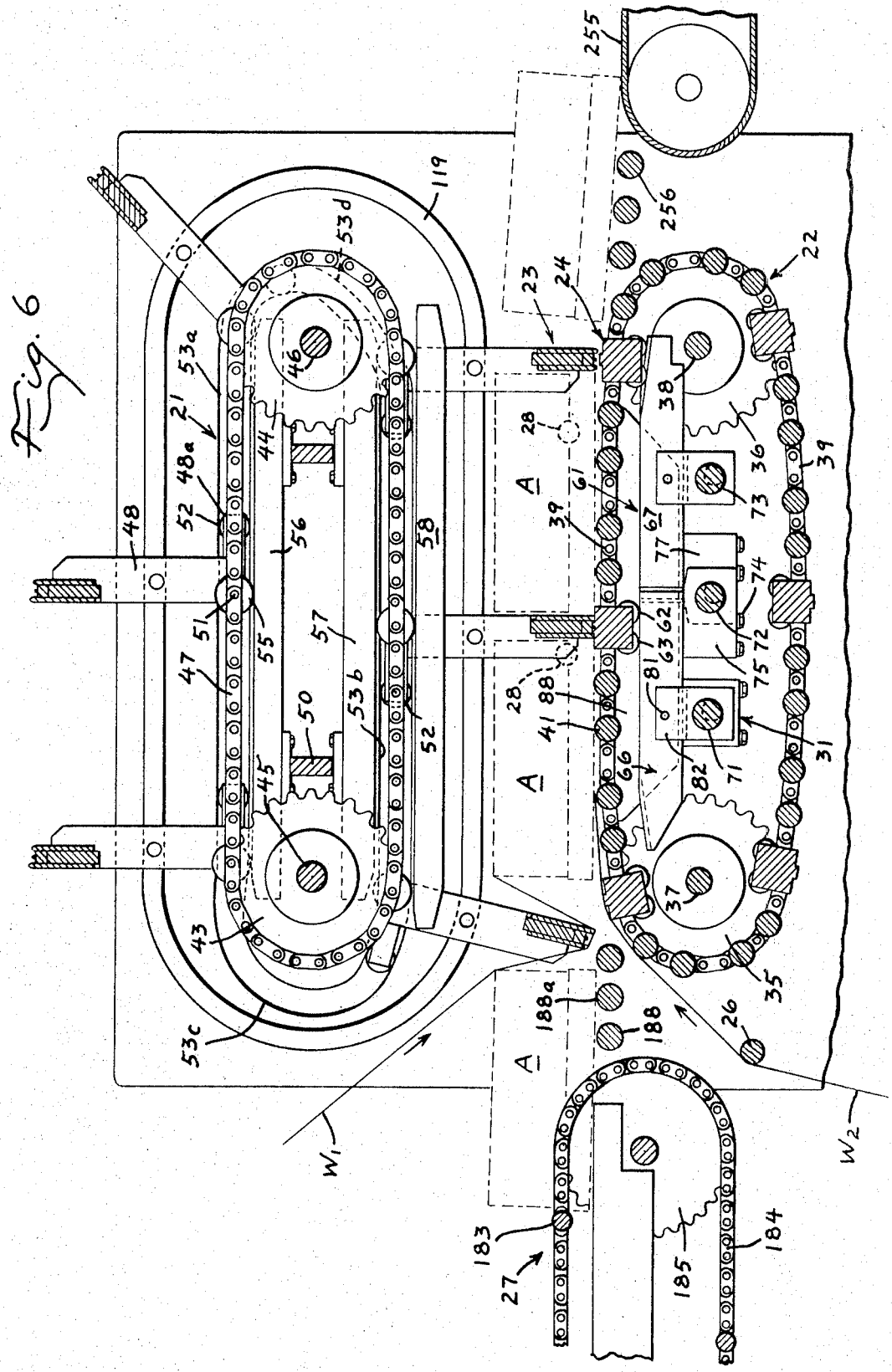
Figure 7:
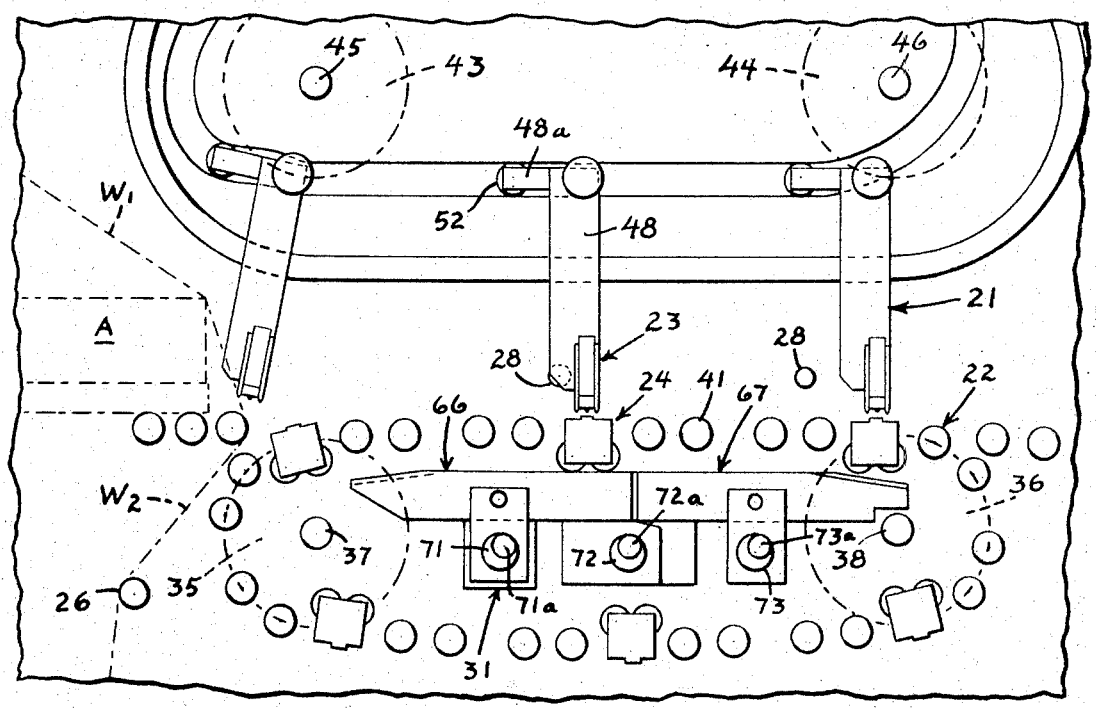

The frame structure for supporting the upper and lower conveyors includes laterally spaced side panels 34 and the lower endless conveyor 22 includes pairs of inlet and outlet sprockets 35, 36 nonrotatably secured to cross shafts 37 and 38 which are rotatably supported by suitable bearings in the side plates 34. Chains 39 are entrained about corresponding pairs of inlet and outlet sprockets 35, 36 adjacent opposite sides of the machine and the lower sealing jaws 24 extend between the chains 39 at uniformly spaced locations therealong. The lower conveyor 22 is arranged to also support articles as they are advanced therealong and article supports 41, preferably in the form of antifriction rollers, are mounted on the chains 39 to extend therebetween and provide a roller bed support for the articles intermediate adjacent lower ones of the jaws 24. Preferably, the lower sealing jaws 24 are arranged to have their upper face disposed adjacent the level of the tops of the article support rollers 41, as shown in FIG. 6.

The upper endless conveyor 21 includes pairs of inlet and outlet sprockets 43 and 44 nonrotatably secured to shafts 45 and 46 which are rotatably supported in suitable bearings on the side plates 34. Chains 47 are entrained around the sprockets 43 and 44 at each side of the machine and the upper sealing jaws 23 are connected to the chains 47 at spaced locations therealong. The endless chains 47 are advantageously disposed at a level above the tops of the articles as they are advanced along the article path and the upper sealing jaws 23 are connected to the chains 47 by elongated arms 48. The arms 48 are mounted on pins 51 (FIGS. 3 and 6) carried by the chains 47 at spaced locations therealong for limited swinging movement relative to the chains about an axis paralleling the upper sealing jaws 23, and a stabilizer lever 48a is attached to each of the jaws and carries a follower 52 offset rearwardly from the arm connecting pins 51. Follower guide tracks 53 are provided on the inner sides of the frame side panels 34 and, as best shown in FIG. 6, include upper and lower track sections 53a and 53b, and inlet and outlet track sections 53c and 53d. The upper and lower track sections 53a and 53b extend generally horizontal and in lateral alignment with the upper and lower runs of the chain 47 so as to support the arms 48 in a generally vertical position during movement of the arms along the upper and lower run of the upper conveyor. The inlet track section 53c, however, is preferably curved outwardly from the path of movement of the chain 47 around sprocket 43, as best shown in FIG. 6 and designed to cause the arm to swing to a generally horizontal position when the arm reaches a point midway between the top and bottom of the sprocket 43 and to thereafter cause the arm to swing at a controlled rate such as to minimize relative movement between the upper sealing jaw 23 and the web $W_1$, during movement of the upper sealing jaw into opposed relation with the lower sealing jaw. The outlet track section 53d is preferably shaped as shown in FIG. 6 so as to curve inwardly from the chain 47 during movement of the latter around the outlet sprocket 44 and in such a manner that, during initial movement of an arm around the outlet sprocket, the arm is maintained in a generally vertical position so as to vertically separate the upper sealing jaw from the lower sealing jaw, and to thereafter smoothly swing the arm around to an upright position as the arm moves to the top of the outlet sprocket 44. Arms 48 also have support rollers 55 disposed coaxial with the arm mounting pins. The rollers 55 are mounted for axial rotation on the arms 48 and have axial sockets 55a (FIGS. 14 and 15) for removably receiving the pins 51 for connecting the arms to the chains. Upper support rails 56 are mounted by cross members 50 (FIGS. 3 and 6) on the side panels to underlie and support the rollers 55 and hence the arms 48 during movement along the upper run, and vertically spaced guide rails 57 and 58 are mounted on the cross members 50 to extend along opposite sides of the path of the rollers 55, during movement along the lower run of chain 47, to guidably support the rollers and hence to guide the sealing jaws 23 connected to the upper conveyor.

The lower sealing jaws 24 are guided during movement along the upper run of the lower conveyor by laterally spaced lower guide rails 61 located adjacent relatively opposite sides of the machine. In order to maintain the lower sealing jaws 24 with their upper faces facing upwardly in a preselected orientation during movement along the sealing run and, the lower sealing jaws are provided with rollers 62 and 63 which are spaced apart in a direction lengthwise of the conveyor 24, as shown in FIGS. 6 and 15, and are also spaced apart in a direction crosswise of the conveyor as shown in FIG. 14 to ride along different portions of the upper surface of the lower guide rails 61.

Provision is made for relatively shifting the opposed pairs of upper and lower sealing jaws 23, 24 as they move along the sealing run to clamp overlapping portions of the web between opposed pairs of sealing jaws when an article is present in front of that pair of sealing jaws and to release the web from between the sealing jaws in the absence of an article in front of that pair of sealing jaws. This is advantageously achieved by relatively shifting the guide rails for the adjacent runs of the upper and lower conveyors and, in the preferred embodiment shown, the lower guide rails 61 for the lower article conveyor are shifted relative to the upper guide rails 57, 58 for the upper jaw conveyor.

Figure 16:
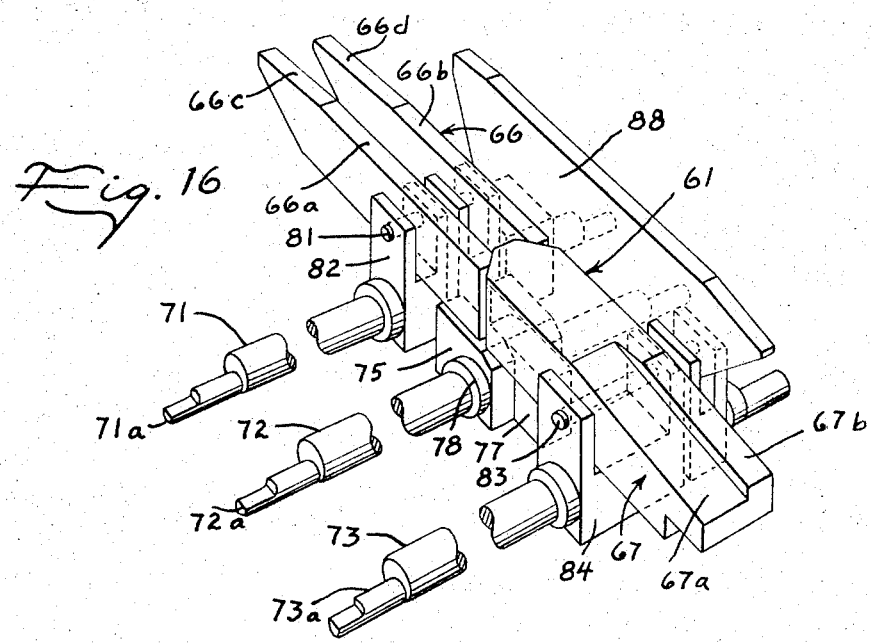
FIG. 16 is a perspective view of one of the sealing jaw guides.
Figure 17:
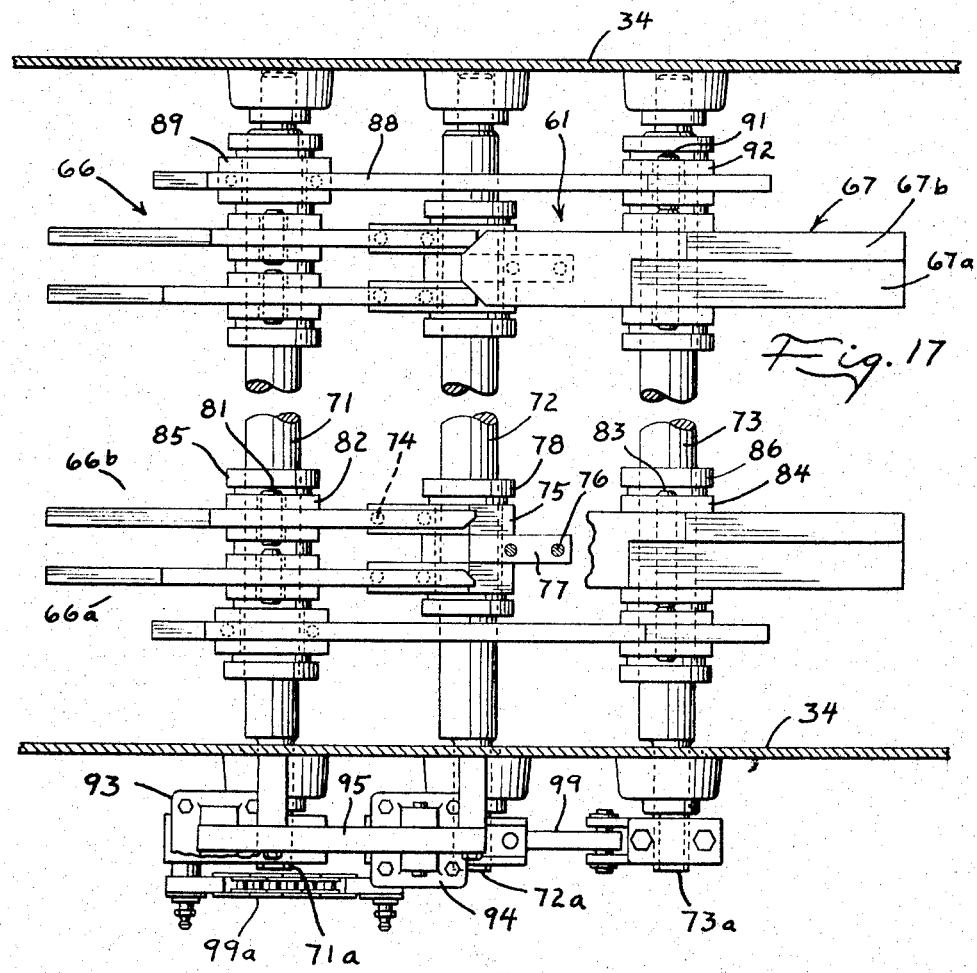
FIG. 17 is a plan view of the sealing jaw guides.

The upper guide rails 57, 58 and the lower guide rails 61 have a length greater than the spacing between adjacent sealing jaws so that one pair of sealing jaws at the trail side of an article is moved into clamping engagement with the web at the trail side of the article before the sealing jaws at the lead side of that article are released from clamping engagement with the web. This minimizes stressing of the heat seal joint between the webs at the lead side of an article during sealing and severing of the webs at the trail side of the article and, moreover, since the sealing jaws are maintained in clamping engagement with the web as they move through a distance greater than the length of the article, the speed of movement of the sealing jaws can be increased while yet providing adequate sealing time for sealing and severing the webs. However, if for any reason articles are not advanced to the wrapping apparatus, it is desirable to avoid continued withdrawal of the webs from the supply rolls, as occurs when the webs are clamped between the moving sealing jaws. This is advantageous not only to avoid withdrawing and wasting wrapping material, but to also avoid the problems which are otherwise encountered with the waste material which tends to become fouled in the wrapping machine or in the subsequent heat shrink apparatus. In order to assure proper sealing of the webs at the trail side of the last article in a series, provision is made for maintaining the pair of jaws at the trail side of the last article in clamping engagement with the webs as that pair of jaws continues movement along the sealing run, while yet relatively moving the succeeding pair of jaws out of clamping engagement with the webs to prevent sealing and severing of the webs by the succeeding pair of jaws. For this purpose, the guides 61 are formed in relatively movable inlet and outlet guide sections generally designated 66 and 67 arranged in end-to-end relation and mounted for movement relative to each other and to the main support structure. The inlet and outlet guide sections 66 and 67 are operated by three cam shafts designated 71, 72 and 73 that extend crosswise of the wrapper and which have eccentric stub shafts 71a–73a rotatably journaled in suitable bearings on the side panels 34, as best shown in FIGS. 16 and 17. The intermediate cam shaft 72 is disposed below the adjacent ends of the inlet and outlet guide sections 66 and 67 and is operatively connected to both the inlet and outlet guide sections. In the embodiment shown, the inlet guide section 66 includes a pair of laterally spaced rails 66a and 66b, the trail ends of which are rigidly secured as by fasteners 74 to spaced follower blocks 75 that rotatably receive the cam shaft 72. The outlet guide section 67 is conveniently formed in one piece and has its forward end rigidly secured by fasteners 76 to a follower block 77 which also rotatably receives the shaft 72 and is conveniently located between the blocks 75. Collars 78 are secured to the shaft at opposite sides of the blocks 75 to laterally retain the same in a position along the cam shaft 72. The guide rails 66a and 66b extend forwardly from the intermediate shaft 72 and are pivotally mounted intermediate their ends by pins 81 on follower blocks 82 that rotatably receive the cam shaft 71. The outlet guide section 67 extends rearwardly from the shaft 72 and is pivotally mounted intermediate its ends by pin 83 on a follower block 84 that is rotatably supported on shaft 73. Collars 85 and 86 are provided on the shafts 71 and 73 to laterally position the follower blocks of the inlet and outlet guide sections on the respective shafts. As will be seen, the cam shafts 71–73 can be rotated to raise and lower the follower blocks and the portions of the guide sections connected thereto and provision is made for selectively rotating the cam shafts. The inlet and outlet guide sections have guide surfaces on the upper side thereof for guiding the lower sealing jaws 24 during movement along the sealing run, which guide surfaces are arranged to engage the aforementioned rollers 62 and 63 on the lower sealing jaws. The inlet guide section 66 has a ramp portion at its inlet end and the guide surfaces on the ramp portion are offset as best shown in FIGS. 6 and 16, with the ramp guide surface 66d that engages the leading rollers 62 on the lower sealing jaws offset below the ramp guide surface 66c that engages the trailing roller 63 on the lower sealing jaws so that the lower sealing jaws are maintained in a generally upright attitude during movement along the inlet ramp portion. Similarly, the outlet guide section 67 has an outlet ramp portion with offset guide faces 67a and 67b arranged so that the ramp section 67a that engages the trailing roller 63 on the lower jaws is offset below the ramp section 67b that engages the lead roller on the lower sealing jaws to also maintain the lower sealing jaws in a generally upright position as it moves off the outlet end of the guide. Chain guides 88 (FIGS. 16 and 17) are provided at opposite sides of the machine to engage the upper runs of the chains 39 of the lower article conveyor 22 to laterally guide the article conveyor. The chain guides 88 have a width to be received between the links on opposite sides of the chains and are advantageously mounted on the cam shafts to be raised and lowered therewith to effect lateral guiding of the conveyor in the different moved positions thereof. As shown, the chain guides 88 have one end rigidly secured to a follower block 89 mounted on the cam shaft 71 and the other end pivotally connected by a pin 91 to a follower block 92 mounted on cam shaft 73.

Plural operators, herein shown two in number and designated 93 and 94 are provided for operating the several cam shafts 71–73. The operators are conveniently of the linear fluid actuated type including cylinder and piston members 93a, 93b and 94a, 94b. As shown in FIG. 5, the cylinder members are mounted by a bracket 95 on one of the side panels 34 of the wrapping machine and the piston members 93b and 94b are respectively connected to levers 96 and 97 nonrotatably secured to the trunnions 71a and 72a on the cam shafts 71 and 72. In the embodiment disclosed, cam shaft 73 is rotated in unison with cam shaft 72 as by a lever 98 nonrotatably secured to the trunnion 73a and interconnected with the lever 97 by a link 99. For reasons pointed out hereinafter, a flexible connector such as a chain 99a is connected to levers 96 and 97 at locations spaced from the trunnions 71a and 71b to assure simultaneous raising of the inlet and outlet guide sections while yet permitting lowering of the inlet guide section before lowering of the outlet guide section.

The upper and lower sealing jaws 23 and 24 are conveniently of the type more fully disclosed in the U. S. Pat. to Roger H. Stohlquist No. 3,553,059 dated Jan. 5, 1971, to which reference is made for a more complete description. As shown in FIGS. 14 and 15, the upper sealing jaw 23 includes an elongated bar 101 which is rigidly secured to the outer ends of the arms 48 and which has a sealing jaw 102 along its underside. The sealing jaw 102 includes a resilient relatively wide seal face 103 and an electrical resistance wire 103a that overlies the heat seal face 103 and which is adapted to melt and sever overlapping portions of the film and heat seal the same along opposite sides of the line of severance. Front and rear clamping jaws 105 and 106 overlie the front and rear faces of the bar 101 and are yieldably urged downwardly to a level below the seal face as by springs 104. As more fully disclosed in the aforementioned patent, stops are provided to limit downward movement of the clamping jaws 105 and 106 relative to the intermediate bar 101 and, preferably, the front clamp jaw is arranged to move downwardly to a level somewhat below the rear clamp jaw so that the front clamp jaw first clamps the overlapping webs to the lower jaw and then yieldably moves upwardly relative to the bar 101, while in clamping engagement with the webs until the rear clamp jaw clamps the webs to the lower jaw.

The lower sealing jaw 24 is also of the type disclosed in the aforementioned patent and includes an elongated rigid bar 111 having a lower sealing jaw 112 and spaced clamping jaws 113 and 114 at opposite sides of the sealing jaw. The lower sealing jaw 112 is resiliently mounted as by springs 116 so as to yieldably move downwardly under a pressure applied by the upper sealing jaw to resiliently clamp and seal the overlapping portions of the wrapping material therebetween. The heat seal wire is energized through conductors 117 connected to brushes 118 engageable with commutator bars 119 on the side panels 34. In the embodiment illustrated, the commutator bars 119 are continuous and disposed in the path of movement of the brushes 118 as the jaws move in their closed looped course so as to continually energize the heat seal wires 103. It is to be understood, however, that the commutator bars 119 can be shortened so as to energize the wires only during movement along a portion of the sealing run to effect "impulse" heat sealing.

The webs $W_1$ and $W_2$ of wrapping material are supplied to the wrapping machine from supply rolls $R_1$ and $R_2$ conveniently located at the side of the wrapping machine. As shown in FIGS. 1 and 4, the support for the upper web supply roll $R_1$ includes support plates 121 and 122 which extend laterally from the side of the machine and which have a web feed roller 123 extending therebetween and rotatably supported thereon by bearings 124. The web supply roll $R_1$ has an axial shaft 126 extending therethrough and supported at its ends by guides 127 so as to maintain the periphery of the roll $R_1$ in contact with the feed roller 123. As shown in FIG. 4, the web $W_1$ from the supply roll $R_1$ passes over an idler 128, dancer roll 129 and over idlers 131 and 132 and then part way around a diagonally extending guide bar 133 at the top of the machine toward the inlet end of the machine and then downwardly around roller 25 to the inlet end of the sealing run. The dancer roll 129 is swingably mounted by arms 148 on a shaft 149 and a switch mechanism 151 is mounted for actuation by a lever 152 on the dancer arm shaft. Switch 151 is connected in the manner described more fully hereinafter to a clutch mechanism 153 for driving the upper web feed roller 123 under the control of the dancer roll, to normally maintain a loop of material around the dancer roll.

The lower web supply roll $R_2$ is mounted on a frame structure including spaced plates 155 and 156. A web feed roll 157 is rotatably supported by bearings 158 in the plates 155, 156 and a shaft 159 extends through the supply roll and is supported by guides 160 which operate to maintain the periphery of the upper web supply roll in driving engagement with the feed roll 157. The lower web $R_2$ passes over an idler 161, around a diagonally extending guide bar 162 and then over another idler 163 and dancer roll 164 to the lower web guide roll 26. The ends of the webs $W_1$ and $W_2$ are joined in a manner described hereinafter to normally form a curtain of material extending crosswise of the article path adjacent the inlet end of the wrapping machine. Dancer roll 164 is mounted by arms 168 on a shaft 169 and a switch mechanism 171 is arranged to be operated by a lever 172 on the dancer arms. Switch 171 is connected in a manner described hereinafter to a clutch 173 for driving the lower web feed roll 157, when the dancer roll 164 is moved upwardly above a preselected lower position, to normally maintain a loop of material around the dancer roll. For reasons pointed out more fully hereinafter, dancer roll brakes 174 and 174a are preferably provided on the lower and upper dancer arm shafts 169 and 149 respectively for selectively locking the dancer arm shafts and hence the dancer rolls 164 and 129 against movement.

The inlet conveyor mechanism 27 operates to advance articles through the curtain and to a position in front of the sealing jaws as they advance along a sealing run. In the embodiment shown, the inlet conveyor includes a bed of rollers 181 mounted between spaced frame members 182 and a plurality of spaced pusher bars 183 located at spaced locations along endless chains 184. The chains 184 are entrained over sprockets 185 and have their upper runs disposed above the level of the rollers 181 so that the pusher bars 183 engage and advance an article therealong. Some of the inlet conveyor support rollers 181a are advantageously driven to aid advance of the articles with the pusher bar onto stationary rails 181b adjacent the outlet end of the inlet conveyor. Support rolls 188 are mounted to extend between the frame members 34 to guide articles from the inlet conveyor onto the article conveyor 22 and, preferably, at least one of the rollers 188a is driven to aid advance of the articles along the article path. Mechanism is provided for advancing articles onto the inlet conveyor 27 and, in the embodiment illustrated, a supply conveyor 191 of the endless type is driven as by a motor 197 to feed articles crosswise of the inlet conveyor 27 against a stop 192, and a transfer mechanism or pusher 193 is provided to transfer articles from the supply conveyor 191 onto the inlet conveyor. The transfer mechanism 193 is operated by a fluid actuator 194 under the control of a valve 195 actuated in timed relation with the inlet conveyor, in a manner described hereinafter to feed one article at a time to the inlet conveyor 27.

The several instrumentalities described above are conveniently driven from a common drive motor 200 and in timed relation with each other. As diagrammatically shown in FIG. 2, the upper and lower conveyors 21 and 22 are operated in timed relation with each other by drive gears 201 and 202 nonrotatably secured to the respective shafts 46 and 38 and disposed in meshing engagement with each other. The lower conveyor shaft 38 is driven by a chain drive including a drive sprocket 203, chain 204, sprocket 205 on the shaft 38 and a tension adjusting idler 206. Drive sprocket 203 is connected to the drive motor 200 through an adjustable speed drive unit 207. The inlet conveyor 27 is driven in timed relation with the article conveyor 22 as by a sprocket 208 on the article conveyor shaft 37, chain 209, and sprocket 211 nonrotatably connected to the shaft 185a for the inlet conveyor sprocket 185. In addition, a drive chain 212 is entrained over the sprocket 213 on the inlet conveyor shaft 185a and around sprockets 214, 215 and 216 on the inlet conveyor rollers 181a to drive the latter. Idler sprockets 217 and 218 are provided to guide the chain 212 around the sprockets 214 and 215 back to the drive sprocket 213. The driven roller 188a between the inlet feed conveyor and the article conveyor is also conveniently driven from the same power train by a sprocket (not shown) behind sprocket 208, through chain 221 and sprocket 222 on the driven roller 188a. Chain guiding and tightening sprockets 223 and 224 are adjustably mounted to enable adjusting the tension in chains 209 and 221 respectively.

Figure 2:
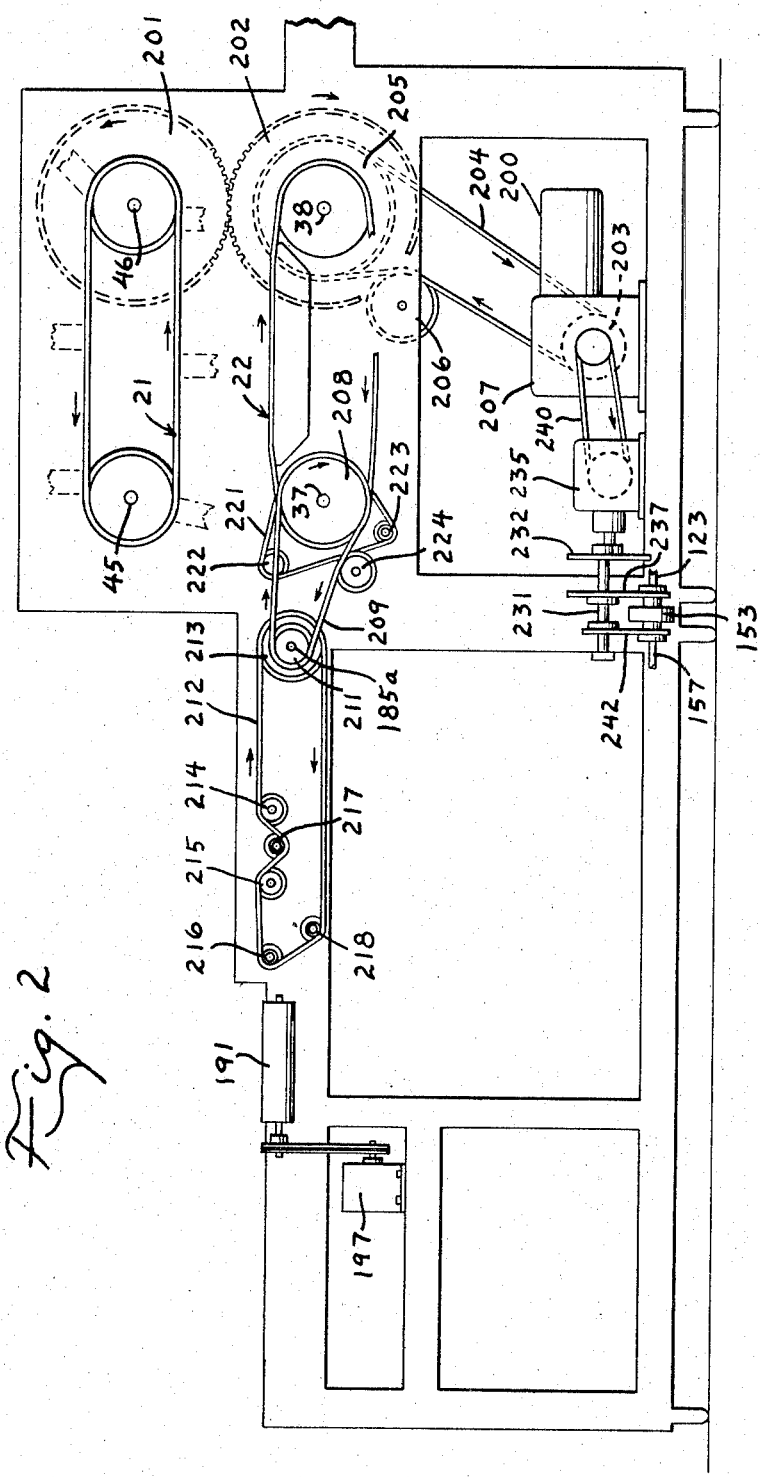
FIG. 2 is a diagrammatic side view of the apparatus illustrating the drive train therefor.

The web feed rolls 123 and 157 are also conveniently driven from the main drive motor 200. As best shown in FIGS. 2 and 4, a jack shaft 231 is connected through a sprocket 232, chain 233 and sprocket 234 to a right angle drive unit 235 and the drive unit 235 is drivingly connected through a chain drive 240 to the adjustable speed drive unit 207. The upper web feed roller 123 is driven by a sprocket 236 on the jack shaft, through a chain 237 to a sprocket (not shown) connected through the aforementioned clutch 153 to the upper web feed roller 123. The lower web feed roller 157 is similarly driven by a sprocket 241 on the jack shaft through a chain 242 to a sprocket (not shown) connected through the clutch 173 to the lower web feed roll 157. The upper and lower supply rolls are thus intermittently driven under the control of the respective clutches 153 and 173 which are in turn operated under the control of the respective dancer arms. Since, in the present apparatus, the upper web is drawn around the lead, top and rear sides of the article, a greater amount of the upper web is consumed during wrapping an article and accordingly the drive sprocket 236 is made somewhat larger than the sprocket 241 so as to feed the upper web at a higher rate than the lower web. An outlet conveyor 255 shown in FIG. 1, is advantageously provided to advance the wrapped articles away from the wrapping machine and guide rollers 256 are positioned between the article conveyor 22 and the outlet conveyor to guide the articles therebetween.

As previously described, article sensing devices 28 are provided for sensing the presence or absence of an article in front of each pair of sealing jaws as they advance along the article path and, in the preferred embodiment illustrated, a pair of such article sensing devices are arranged to sense the presence or absence of articles at spaced locations above the article conveyor 22. The article sensing devices are conveniently photoelectric type sensing units designated generally by the numerals 261 and 262. The photoelectric sensing unit 261 is located above the inlet guide section and is spaced from the inlet end of the inlet guide section a distance less than the spacing between adjacent pairs of sealing jaws as they move along the sealing run so that it senses the lead end of an article before the pair of sealing jaws at the trail side of that article can move to a closed position. Photoelectric sensing unit 262 is located above the outlet guide section 67 and is spaced from the inlet end of the guide rails a distance less than twice the spacing between adjacent sealing jaws so that it senses the presence of the lead side of an article above the outlet section before the second preceding pair of sealing jaws can move into opposed relation at the inlet end of the sealing run.

A control circuit for the apparatus is schematically illustrated in FIG. 18 and, as diagrammatically illustrated therein, the article sensing unit 261 includes a light source 261a and a photosensitive device 261b conveniently disposed at relatively opposite sides of the machine, at the location described above. The photosensitive device 261b operates a relay 261c that controls normally closed relay contacts 261d and normally opened relay contacts 261e. The light source 261a is connected across conductors 264, 265 and the photosensitive device 261b and relay 261c are also connected in a series circuit to conductors 264, 265. Relay contacts 261d are closed when the light beam is interrupted and are connected in a series circuit with a first time delay relay 267 to the conductors 264, 265. Contacts 261e are open when the light beam is interrupted and are connected in a series circuit with a normally closed manual seal switch 268 and a second time delay relay 269 to the conductors 264, 265. A second normally open manual seal switch 268a is connected between power conductor 264 and the time delay relay 267.

The first time delay relay 267 is energized each time the light beam between source 261a and photosensitive device 261b is interrupted and operates after a selected time delay, sufficient to discriminate against short duration light beam interruptions caused by the arms 48 cutting the light beam, to close normally open relay contacts 267a. Relay contacts 267a are connected in series with a control relay 271 and operate, when closed, to energize the control relay 271 which in turn closes normally open relay contacts 271a, 271b and 271c. Relay contacts 271a, when closed, establish a holding circuit for relay 271 through normally closed relay contacts 269a operated by the second time delay relay 269. The second time delay relay 269 is energized when the light beam between light source 261a and photosensitive device 261b is re-established, as occurs when no article is present at that location, and operates after an adjustable time delay to open the normally closed relay contacts 269a and interrupt the holding circuit for the control relay 271. A manually operable, normally open seal switch 272 is also connected to relay 271 to enable selective manual operation of the control relay 271.

The second photoelectric sensing unit 262 includes a light source 262a and a photosensitive element 262b located at relatively opposite sides of the machine for sensing articles above the outlet section of the guide rail. The photoelectric element 262b operates a relay 262c and is connected to the power supply conductors 264 and 265 to be energized thereby. Photoelectric relay 262c operates normally closed contacts 262d and normally open contacts 262e. Contacts 262d are closed when the light beam is interrupted and are connected in a series circuit with a third time delay relay 275 which operates an adjustable time delay after energization, sufficient to discriminate against short duration light beam interruptions caused by arms 48 cutting the light beam, to close the normally open relay contacts 275a. Contacts 262e are open when the light beam is interrupted and are connected in a series circuit with a fourth time delay relay 276 which operates an adjustable time delay after energization to open normally closed contacts 276a. Normally open relay contacts 275a are connected in a series circuit with a control relay 278 which is operative when energized, to open normally closed relay contacts 278a and close normally open relay contacts 278b. It is desirable to allow the heat seal joint between the webs $W_1$ and $W_2$ to cool somewhat for greater strength prior to retracting and provision is made for delaying retraction of the webs after they are released from between all of the sealing jaws along the sealing run. For this purpose, time delay relay 276 is adjusted to delay opening of contacts 276a for a time, for example four seconds, sufficient to allow the heat seal joint to cool. Contacts 278a are connected in a series circuit with the normally closed time delay relay contacts 276a to a full-wave rectifier circuit 279 that supplies power to the dancer brakes 174 and 174a, and relay contacts 278a are also connected as shown at 280 in series with the time delay relay 276. A control relay 281 is also energized under the control of relay contacts 278a and 276a and is operative, when energized, to open normally closed relay contacts 281a and 281b.

Fluid such as air under pressure is reversibly supplied to the operators 93 and 94 under the control of valves 285 and 286 (FIG. 5) conveniently of the electrically operated type having electroresponsive operators 285a and 286a respectively. Valves 285 and 286 are normally urged to a position supplying fluid pressure to the operators 93 and 94 to urge them to their extended position shown in FIG. 5 and are operative, when their electroresponsive operators are energized, to move the apply fluid pressure to the operators to retract the same. As diagrammatically shown in FIG. 18, the main power conductor 264 is connected through relay contacts 291a of a main control relay 291 to a power conductor 264a and power from the latter is supplied through normally open relay contacts 271b and 271c to the electroresponsive operators 285a and 286a of the air valves 285 and 286 respectively. Normally open relay contacts 278b are connected in parallel with relay contacts 271c so as to also control energization of the solenoid 286a for valve 286. Power from conductors 264a is also applied through the normally open limit switch 151, normally closed relay contacts 281a controlled by aforementioned relay 281, and bridge rectifier circuit 293 to the clutch 153 that controls driving of the upper web feed roller 123. Power is supplied through limit switch 171 and normally closed relay contacts 281b controlled by the relay 281 through a bridge rectifier circuit 294 to the clutch 173 that controls driving of the lower web feed roller 157. The dancer bars operate, when raised out of their preselected lowered position, to close the respective limit switches 151 and 171 to energize the respective clutches and drive the respective feed rollers to feed material and to interrupt feed of material when a preselected slack loop has been established. Relay contacts 281a and 281b, however, are additionally provided in the clutch energizing circuits for the clutches 153 and 173 to prevent feeding of material from the upper and lower web supply rolls R₁ and R₂ when the dancer brakes 174 and 174a are energized.

The article transfer mechanism 193 is operated in timed relation with the wrapper to transfer articles to the infeed conveyor. Valve 195 is normally urged to a position applying fluid pressure to the linear fluid actuator 194 to retract the same, and the valve has an electroresponsive operator 195a operative, when energized, to apply fluid pressure to the actuator 194 to extend the same. The valve actuator 195a is connected in a series circuit with normally open relay contacts 296a of time delay relay 296, and normally open switch 297. Switch 297 is operated to its closed position by a cam 298 driven by a shaft such as inlet conveyor shaft 185a that completes one revolution for each cycle of the wrapping machine, that is in the time that the sealing jaws 23, 24 move through a distance equal to the spacing between adjacent pairs of jaws. The inlet conveyor 27 is timed by the chain drive 209 to advance articles into the joined webs W₁ and W₂ and between the upper and lower sealing jaws to a position in front of the sealing jaws adjacent the inlet end of the sealing run. The article pushers 183 on the inlet conveyor are spaced apart a distance greater than the spacing between the sealing jaws 23, 24 on the wrapping machine and the inlet conveyor is driven at a somewhat higher linear speed than the sealing jaws so as to advance the pusher bars 183 a distance corresponding to the spacing between adjacent bars in the same time that the jaws 23, 24 advance a distance equal to the spacing between adjacent sealing jaws. The cam 298 has a lobe 298a arranged to close switch 297 in timed relation with the movement of the bars such that the transfer mechanism 193 will advance an article at the article stop 192 onto the inlet conveyor in proper time to be engaged by a pusher bar. The lobe on cam 298 provides a dwell closing of the switch 297 sufficient to allow the operator 194 to extend the transfer mechanism and, when the cam releases the switch, the valve actuator 195a is deenergized to allow retraction of the operator 194.

The time delay relay 296 is energized under the control of a normally open limit switch 299 positioned as shown in FIG. 1 to be closed when an article is advanced by conveyor 191 against the stop 192. A second normally open cam operated switch 300 is connected in parallel with switch 299 to also control energization of time delay relay 296. Switch 300 is operated by a cam 301 driven through one revolution during each cycle of the wrapping machine and cam 301 is arranged to close switch 300 as the transfer starts to extend and to hold switch 300 closed while the transfer mechanism is extended and retracted and for a short time thereafter sufficient to allow advance of a succeeding article on conveyor 191 to the stop 192 and close switch 299. The cam 301 has a notch 301a arranged to allow the switch 300 to open once each revolution of the cam, just prior to closing of switch 297 by cam 298. Time delay relay 296 is adjusted to delay closing of relay contacts 296a for a time interval at least equal to the delay in retracting of the webs by time delay relay 276, to interrupt feeding of articles during that time interval.

The main drive motor 200 and the supply conveyor drive motor 197 are connected through main start relay contacts 291b to a suitable power source. Main start relay 291 is energized under the control of a normally open start switch 303 and normally closed stop switch 304. Relay 291, when energized, closes the aforementioned contacts 291a and 291b and also closes contacts 291c connected in parallel with the start switch 303 to hold the relay energized until the stop switch 304 is opened.

OPERATION

Figure 8:
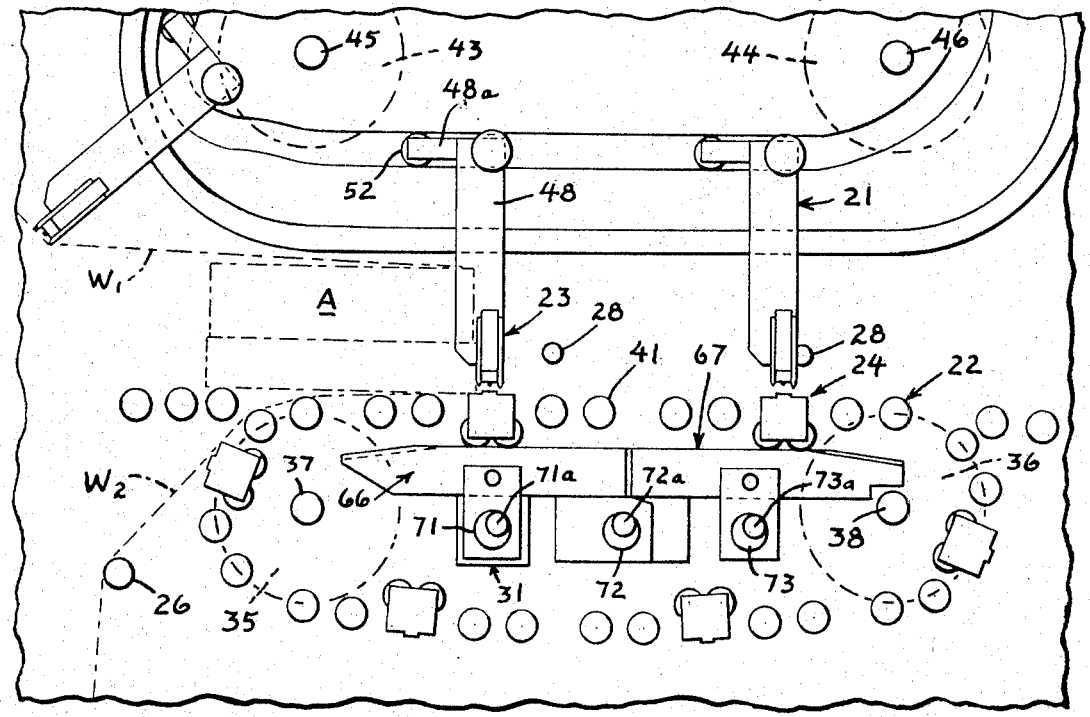

The start switch 303, when closed, energizes main relay 291 which closes contacts 291c in a holding circuit to maintain the main relay continuously energized until the stop switch 304 is opened. Relay 291 closes contacts 291b to apply power to the main drive motor 200 and to the supply conveyor motor 197. The motor 200 drives sprocket 203 continuously through the adjustable speed drive 207 so tat the upper and lower conveyors 21 and 22 are driven continuously at a selectively adjustable speed during operation of the machine and sequentially move pairs of jaws 23, 24 into opposed relation adjacent the inlet end of the sealing run then lengthwise along the sealing run a distance greater than the spacing between adjacent pairs of jaws and then laterally away from each other. The articles A to be wrapped are advanced along the inlet conveyor through the curtain of material formed by webs $W_1$ and $W_2$ and into a position in front of a pair of jaws as they move toward the inlet run, as best shown in FIG. 8. The adjacent pairs of jaws are spaced apart a distance only slightly greater than the length of the articles to be wrapped and, as the jaws move toward the inlet end of the sealing run, the upper jaws 23 draw the upper web downwardly along the trail side of the article and engage the article to advance it along the sealing run.

Figure 9:
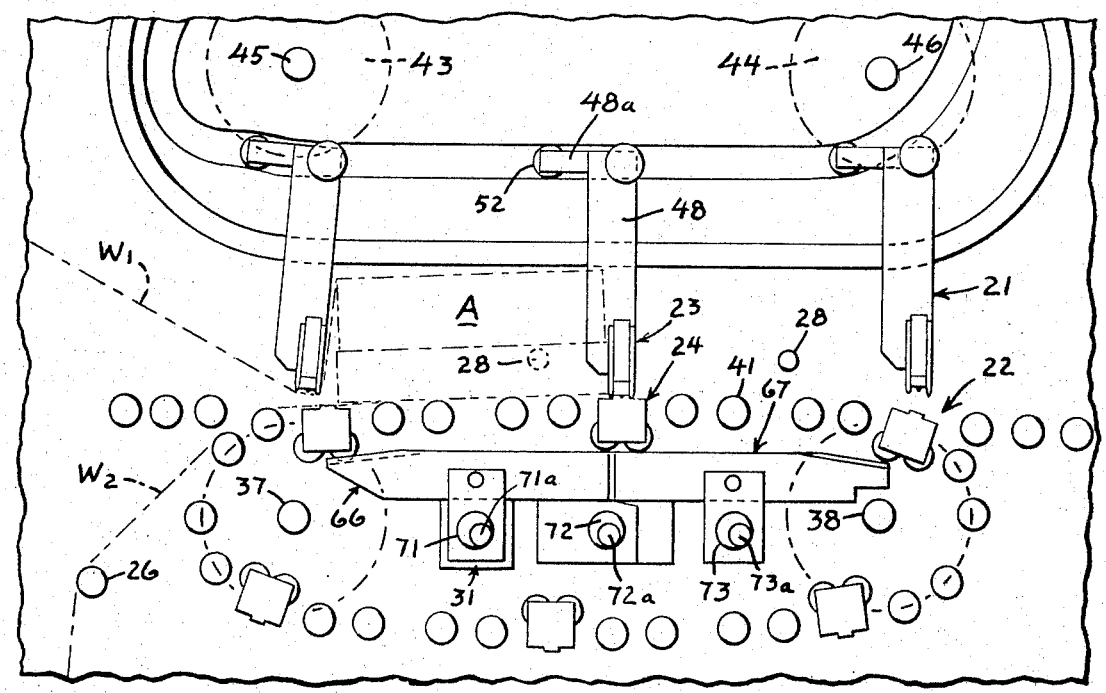

When the lead side of an article A is advanced to a position adjacent the first photoelectric sensing unit 261, it operates the same to effect raising of the lower guide rail. In particular, when the lead side of the article reaches a position to interrupt the light beam between light source 261a and sensor 261b, it deenergizes the photoelectric relay 261c to allow relay contacts 261d to close and relay contacts 261e to open as shown in FIG. 18. When relay contacts 261d close, they energize the first time delay relay 267 which, after a short time interval sufficient to prevent spurious operation of the timing relay by the arms of the sealing jaws, operates to close relay contacts 267a and energize the control relay 271. Relay 271, when energized, closes relay contacts 271a, 271b and 271c. Relay contacts 271a establish a holding circuit for the control relay 271 through the relay contacts 269a. Relay contacts 271b and 271c operate to energize the electroresponsive operators 285a and 286a for the fluid control valves 285, 286 to move the operators 93 and 94 to the raised position shown in FIGS. 5 and 9. The chain 99a (FIG. 5) that interconnects the arms 96 and 97 assures that operator 93 will not move the inlet guide section 66 to its raised position before operator 94 moves the outlet guide section to its raised position. Thus, as a pair of jaws move into opposed relation at the inlet end of the sealing run behind an article A, the inlet and outlet guide sections are raised and operate to shift the lower jaw toward the upper jaw into clamping engagement with the overlapping portions of the webs. The inlet and outlet guide sections operate to maintain the pair of jaws at the trailing side of that article in clamping engagement with the web as the article is advanced along the sealing run. The second photoelectric sensing unit 262 is preferably spaced from the first photoelectric sensing unit 261 a distance less than the spacing between adjacent sealing jaws so that the lead side of the article will operate unit 262 before the trial side of the article passes the unit 261. However, time delay relay 269 delays opening of contacts 269a a selected time interval after an article passes the first photoelectric sensing unit 262 and hence maintains relay 271 energized to hold contacts 271b and 271c closed for a time interval after the article passes the first unit sufficient to allow the second photoelectric sensing unit 262 to energize relay 275 and close contacts 278b before the contacts 271c are opened. When the lead side of the article reaches second photoelectric sensing unit 262, it interrupts the light beam and deenergizes the relay 262 so as to close contacts 262d and open 262e as shown in FIG. 18. Contacts 262d, upon closing, energize the timing relay 275 to close the normally open contacts 275a and energize control relay 278. Relay 278, when energized, closes relay contacts 278b to maintain the electroresponsive operator 286a for valve 286 energized to thereby maintain the outlet guide section in its raised position.

Figure 10:
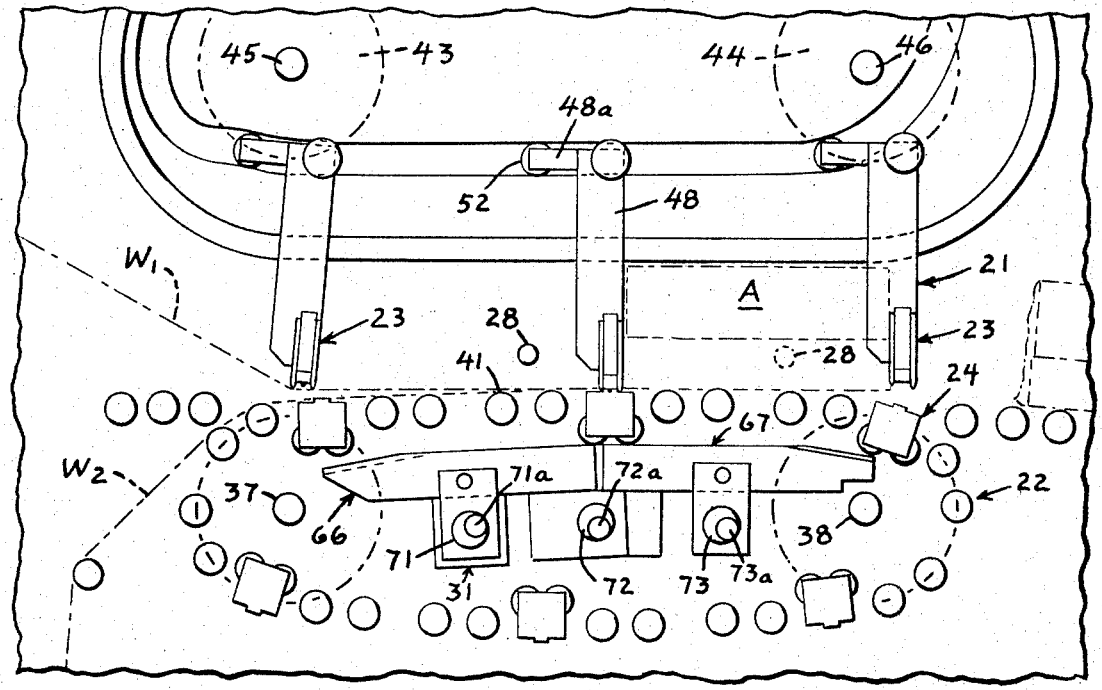
Figure 11:
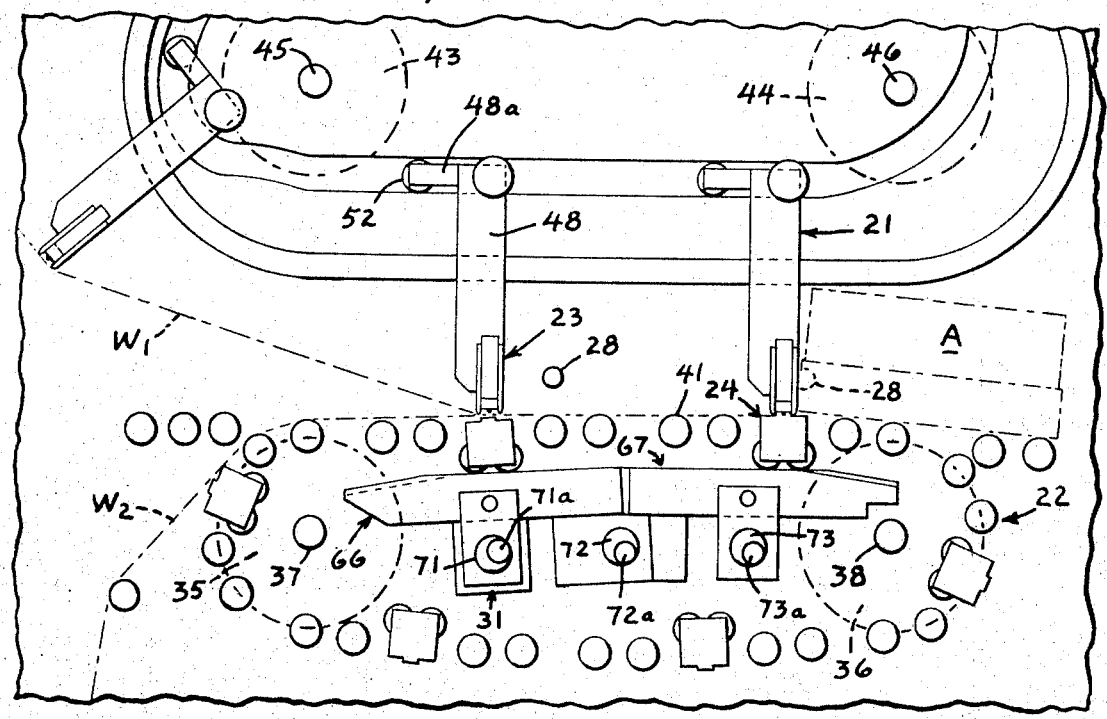
Figure 12:
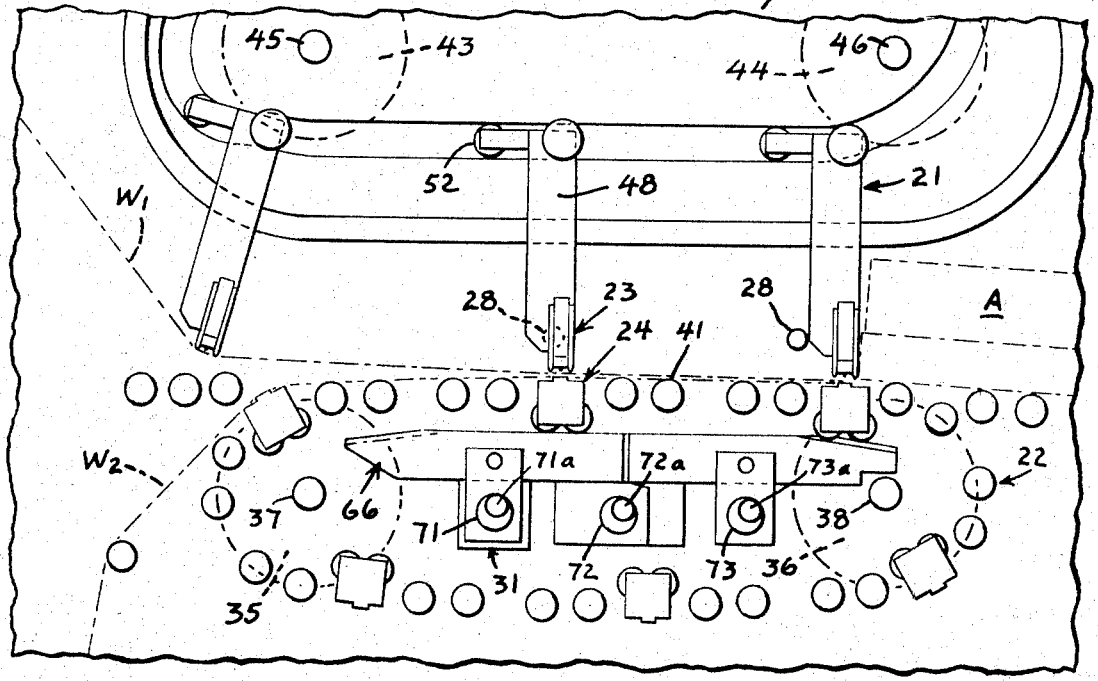

In the absence of an article in front of the succeeding pairs of sealing jaws, as shown in FIG. 10, the first photoelectric sensing unit 261 operates as soon as the preceding article passes the same to open contacts 261d and close contacts 261e. Opening of contacts 261d deenergizes the time delay relay 267 and immediately opens the contacts 267a to deenergize the control relay 271 which, in turn, opens contacts 271b and 271c. The electroresponsive actuator 285a for valve 285 is then deenergized so that the operator 93 moves the inlet guide section to its lower position as shown in FIG. 10. This prevents the next succeeding pair of jaws from clamping the overlapping portions of the web therebetween as they advance along the inlet portion of the sealing run and, when the preceding pair of jaws advances the article past the second photoelectric sensing unit 262, the latter is also operated to move the outlet guide section to its lower position as shown in FIG. 12. The length of the sealing run is made greater than the spacing between adjacent jaws but preferably less than twice the spacing between adjacent jaws so that each pair of jaws adjacent the outlet end of the guide are released prior to movement of the second succeeding pair of jaws at the inlet end of the guide into opposed relation. Thus, in the absence of an article at any location along the sealing run, the webs are released and can be retracted as shown in FIG. 13 to a position at the inlet end of the sealing run.

Since the wrapped article is severed from the webs, the joint between the webs at the trail side of the wrapped article is not subject to stresses due to tension in the webs $W_1$ and $W_2$. Moreover, when consecutive articles are wrapped on the machine, the webs are clamped together at the trail side of each article before the jaws are released from the webs at the lead side of the article so that the joint between the webs at the lead sides of the articles are not subject to stresses due to tension in the webs $W_1$ and $W_2$. However, when the last article in a series moves past the second photoelectric sensing unit 262, and all of the jaws along the sealing run are released from clamping engagement with the web, the joint between the upper and lower webs is hot and susceptible to rupture if the webs $W_1$ and $W_2$ are immediately retracted. Accordingly, provision is made for delaying retraction of the webs $W_1$ and $W_2$ for a short time interval such as three or four seconds after all the sealing jaws are released from the webs to allow the joint to cool below the melting temperature of the material. This is achieved by operating the dancer brakes 174a and 174 for the upper and lower webs to hold the dancer rolls 129 and 164 against movement for that time interval. At the end of that time interval, the dancer brakes are released and the webs then retracted. More specifically, when an article interrupts the light beam of the photoelectric sensing unit 262, relay 275 is energized after a delay sufficient to prevent spurious operation due to the passage of a sealing jaw 23 or sealing jaw arm 48, to close contacts 275a and operate control relay 278 to open relay contacts 278a to thereby interrupt application of power to the dancer brakes 174 and 174a. When the last article passes the unit 262, contacts 262d are opened and contacts 262e are closed. Opening of contacts 262d deenergizes time delay relay 275 to allow contacts 275a to open immediately and thereby deenergize control relay 278 so that contacts 278a again close. Closing of contacts 262e establishes a circuit through relay contacts 276a to dancer brakes 174 and 174a to energize the dancer brakes when the last article passes detector 262. However, closing of contacts 262e also operates time delay relay 276 to open relay contacts 276a a short time interval after the last article passes detector 262, to again interrupt application of power to the dancer brakes. The time delay of relay 276 is adjusted to have a short duration such as three or four seconds and, during this short time interval, determined by the time delay relay 276, the dancer brakes are energized to hold them in their raised positions so as to delay retracting of the webs. While the dancer brakes are energized, relay 281 is also energized to open relay contacts 281a and 281b and prevent application of power to the clutches 153 and 173 for driving the upper and lower web feed rollers 123 and 157 to prevent feeding of the upper and lower webs during that short interval should their respective dancer arm switches 151 and 171 be in the closed position.

As previously described, the wrapping machine can be adjusted to operate at different speeds. At relatively low speeds below 15 articles per minute (one in each 4 seconds) the aforedescribed delay of about 4 seconds in retracting the webs after passage of the last article in a series, would not prevent the machine from properly wrapping the first article in a next series of articles, even if the first article in the next series was spaced only one article from the last article of the preceding series. However, the machine is adapted for high speed wrapping at speeds of 60 articles per minute and more. In order to accommodate the aforedescribed delay of about 4 seconds in retracting the webs at the end of one series, it is necessary to delay feeding of the lead article in the next series sufficient to provide at least the same 4 second delay between the last article in one series and the lead article in the next series of articles. For example, at 60 articles per minute (1 per second) it is necessary to delay feeding of the first article of the next series so as to provide a space of at least four articles between the last article of one series and the first article of the next. At 75 articles per minute, at least five spaces would be required to accommodate the 4 second delay, and at 90 articles per minute, six spaces would be required.

Delay in feeding the first article in a succeeding series could be achieved by stopping the inlet conveyor 27 for a time corresponding to the delay in retracting the webs. In the apparatus disclosed, the control of the article feed is upstream of the inlet conveyor 27. Switch 299 is closed when an article is advanced to a position in front of the transfer mechanism 193 and energizes time delay relay 296. Time delay relay 296 is adjusted to delay closing of relay contacts 296a for a time interval corresponding to the delay in retracting the webs at the end of a series of articles (about four seconds).

Relay contacts 296a are connected in series with cam switch 297 to control energization of the valve actuator 195a and, when contacts 296a are closed after the time delay, the valve actuator will be energized in timed relation with the inlet conveyor when cam lobe 298a closes switch 297 to thereby extend the transfer mechanism and transfer an article to the inlet conveyor 27. As the article is advanced by the transfer mechanism onto the inlet conveyor 27, it allows switch 299 to open. However, cam switch 300 is connected in parallel with switch 299 and is arranged to be closed during extension and retraction of the transfer mechanism and until a succeeding article has had time to advance along the supply conveyor 191 and close the switch 299. This prevents deenergization of the time delay relay 296 when successive articles are advanced to the article stop 192. However, if an article is not advanced during one cycle of the machine, switch 299 will not be closed and, during a portion of each cycle switch 300 will also be opened by the recess 301a in cam 301 to deenergize relay 296. The relay substantially immediately opens contacts 296a and, when a subsequent article is advanced to the article stop 192, the time delay relay will delay closing of contacts 296a and hence delay feeding of articles for a time interval sufficient to provide the requisite spacing between the last article of one series and the first article of the next series.

From the foregoing it will be seen that the wrapping is effected while the sealing jaws are in continuous motion and while they move along the sealing run a distance greater than the spacing between adjacent pairs of jaws. This allows a pair of sealing jaws to move into sealing position at the trail side of an article before the sealing jaws at the lead side of the article are released so that stressing of the heat seal joint at the lead side of the article due to closing of the jaws at the trial side of the article is effectively avoided. Moreover, the increased length of the sealing run provides a relatively longer seal time for a given rate of movement of the sealing jaws along the sealing run and, conversely, allows the sealing jaws to be moved relatively faster for a given seal time.

While the apparatus will automatically operate to seal successive packages as they are advanced between adjacent pairs of sealing jaws, it is automatically operative to avoid sealing and severing of the web in the absence of an article in front of a pair of sealing jaws so that the web can be retracted back to a position at the inlet end of the sealing apparatus. Since the apparatus does not consume material in the absence of an article, it avoids waste of the material and further avoids the problems incident to the presence of such waste material either in the wrapping apparatus or in a subsequent heat tunnel.

While a preferred embodiment of the invention has been herein disclosed, various modifications will become apparent to those skilled in the art and it is understood that the invention is not to be limited except as required by the appended claims.

The embodiments of the invention in which an exclusive property or privilege is claimed are defined as follows:

1. A method of wrapping articles in webs of heat sealable material as the articles move along an article path, comprising: continuously moving a plurality of upper jaws in spaced succession along a closed loop course first downwardly along an inlet run; then forwardly along a sealing run a distance greater than the spacing between adjacent upper jaws; then upwardly along an outlet run; and finally rearwardly in a return run above the article path back to the first run, moving a plurality of spaced lower jaws along the sealing run in opposed relation to respective ones of the upper jaws, supporting end sections of first and second webs of material respectively above and below the article path, the ends of which webs have previously been joined to form a curtain across the article path adjacent the inlet end of the sealing run, advancing articles along the path into the curtain and below one of the upper jaws as it moves along the inlet run to a position in front of that upper jaw for advance therewith along the sealing run, sensing the presence or absence of an article in front of each upper jaw as it begins movement along the sealing run, relatively shifting the upper and lower jaws of an opposed pair into clamping engagement with a curtain therebetween when an article is present in front of that pair of jaws as they begin movement along the sealing run and maintaining that pair of jaws in clamping engagement with the curtain behind the article as that pair of jaws advance along the sealing run a distance greater that the spacing between adjacent upper jaws, relatively shifting the upper and lower jaws of an opposed pair to a position out of clamping engagement with the curtain therebetween when no article is present in front of that opposed pair of jaws as they begin movement along the sealing run, severing the overlapping portions of the curtain and sealing the overlapping portions along opposite sides of the severance when the curtain is clamped between an opposed pair of the upper and lower jaws, and retracting the curtain after all of the pairs of jaws along the sealing run are moved out of clamping engagement with the curtain.

2. The method of claim 1 wherein a pair of the upper and lower jaws are maintained in clamping engagement with the curtain behind an article until the pair of jaws have advanced along the sealing run a distance less than twice the spacing between adjacent pairs of jaws and are then released from clamping engagement with the curtain.

3. The method of claim 2 wherein a pair of upper and lower jaws are maintained out of clamping engagement with the curtain in the absence of an article in front of that pair of jaws at least until the preceding pair of upper and lower jaws are moved out of clamping engagement with the curtain.

4. A method of wrapping articles in webs of heat sealable material as the article move along an article path comprising: continuously moving a plurality of upper jaws in spaced succession along a closed loop course first downwardly along an inlet run; then forwardly along a sealing run; then upwardly along an outlet run; and finally rearwardly in a return run above the article path, moving a plurality of spaced lower jaws along the sealing run in opposed relation to respective ones of the upper jaws, guiding the upper and lower jaws respectively along upper and lower guides as they move along the sealing run a distance greater than the spacing between adjacent upper jaws, supporting end sections of first and second webs of material respectively above and below the article path, the ends of which webs have previously been joined to form a curtain across the article path, advancing a series of articles in succession along the path into the curtain and below an upper jaw as it moves along the inlet run to a position in front of an upper jaw for advance therewith along the sealing run, sensing said advance of articles into the curtain to a position in front of an upper jaw, relatively shifting the upper and lower guides toward each other when the first article in the series is advanced to the sealing run to guide the upper and lower jaws of an opposed pair in clamping engagement with the webs as the jaws move along the sealing run and relatively shifting the guides away from each other when the last article in the series reaches the outlet end of the sealing run to release the upper and lower jaws from clamping engagement with the curtain, severing overlapping portions of the curtain and sealing overlapping portions of the curtain at opposite sides of the severance when the overlapping portions of the curtain are clamped between the jaws of an opposed pair, and retracting the curtain after all of the opposed pairs of upper and lower jaws along the sealing run are released from clamping engagement with the curtain.

5. The method of claim 4 wherein guides are shifted away from each other adjacent an inlet portion of the sealing run as the last article in a series moves away from said inlet portion of the sealing run and the upper and lower guides are thereafter shifted away from each other adjacent the outlet portion of the sealing run as the last article in a series moves away from said outlet portion of the sealing run.

6. The method of claim 4 including delaying retraction of the webs after all of the pairs of sealing jaws are released from clamping engagement with the curtain along the sealing run for a time interval to allow the heat seal joint between the webs to cool substantially below the melting temperature of the material.

7. An apparatus for wrapping articles in heat sealable sheet material as they move along an article path comprising:
upper and lower endless conveyor means each having a plurality of sealing jaws spaced therealong and arranged to have adjacent sections extend forwardly along the article path in a sealing run having a length greater than the spacing between adjacent sealing jaws and with the sealing jaws on the upper and lower conveyor means moving in opposed pairs along said sealing run, means for supporting end sections of two webs at opposite sides of the article path, the ends of which webs have previously been joined to form a curtain of the material adjacent the inlet end of said sealing run, means for advancing an article along the article path into the curtain to draw the curtain along the top and bottom of the article and to position the article in front of a pair of sealing jaws as they move toward the inlet end of said sealing run, article sensing means for sensing the presence or absence of an article in front of the pairs of sealing jaws as they move along the sealing run, and jaw operating means operative when an article is present in front of a pair of sealing jaws for relatively shifting the sealing jaws of that pair toward each other into clamping engagement with overlapping portions of the curtain as that pair of sealing jaws move along said sealing run a distance greater than the spacing between adjacent sealing jaws, said jaw operating means being operative in the absence of an article in front of a pair of sealing jaws at the inlet end of the sealing run for relatively moving the sealing jaws of that pair away from each other out of clamping engagement with overlapping portions of the curtain, means on said sealing jaws for severing and sealing the curtain along opposite sides of the severance line when the curtain is clamped between the pairs of sealing jaws, and means for retracting the curtain after all of the pairs of sealing jaws are moved out of clamping engagement with the curtain.

8. An apparatus for wrapping articles according to claim 7 including upper and lower guide means for guiding the sealing jaws on the upper and lower conveyor means along said sealing run, said jaw operating means including means for relatively shifting said upper and lower guide means toward and away from each other.

9. An apparatus for wrapping articles according to claim 7 wherein said article sensing means includes a first means for sensing articles at a first location spaced from the inlet end of the sealing run a distance less than the spacing between adjacent sealing jaws and a second means for sensing articles at a location spaced from the inlet end of the sealing run a distance greater than the spacing between adjacent sealing jaws and less than twice the spacing between adjacent sealing jaws.

10. An apparatus for wrapping articles in heat sealable material as they are advanced along an article path comprising: web support means for supporting end sections of two webs of said material respectively above and below the article path, the ends of which webs have previously been joined to form a curtain extending crosswise of said path, a lower endless type article conveyor means having an upper section extending forwardly from said curtain along said article path, an upper endless type jaw conveyor means disposed above said article conveyor means and supporting a plurality of jaws for movement in a closed loop course including a lower section extending forwardly adjacent said upper section of said article conveyor means in a sealing run therewith, first and second guide means for respectively guidably supporting said upper run of said article conveyor means and said lower run of said jaw conveyor means during movement along said sealing run a distance greater than the spacing between adjacent pairs of jaws, means for advancing an article to be wrapped into said curtain and onto said article conveyor means to draw the curtain of material along the lead side and along the top and bottom of the article advanced onto the article conveyor means, means for sensing an article advanced onto said article conveyor means, guide moving means responsive to said sensing means operative when an article is advanced onto said article conveyor means to relatively move said first and second guide means toward each other to a sealing position in which a jaw on the upper jaw conveyor means is operative to clamp overlapping portions of the webs to said article conveyor means, said guide moving means being operative in the absence of an article on said article conveyor means to relatively move said first and second guide means away from each other to a release position in which a sealing jaw on the jaw conveyor means releases the overlapping portions of the webs from clamping engagement with the article conveyor means, means for severing overlapping portions of the webs and for heat sealing the overlapping portions along opposite sides of the line of severance while the overlapping portions are clamped to the article conveyor means, and means for retracting at least one of said webs after the overlapping portions of the web are released.

11. An apparatus according to claim 10 wherein said first and second guide means are arranged so that the maximum length of the sealing run is less than twice the spacing between adjacent pairs of sealing jaws.

12. An apparatus for wrapping articles according to claim 10 wherein said one of the items comprising said first and second guide means has an inlet guide section and an outlet guide section, said means for sensing articles including a first sensing means for sensing an article adjacent said inlet guide section and a second sensing means for sensing an article adjacent said outlet guide section, said guide moving means including means operative when said first sensing means senses the absence of an article adjacent said inlet guide section to move said inlet guide section to its release position and said guide moving means including means operative when both said first and second sensing means sense the absence of an article adjacent both said first and second guide sections for moving both said inlet and outlet guide sections to their release positions.

13. An apparatus for wrapping articles according to claim 12 wherein said first sensing means is arranged to sense the presence of an article at a location spaced from the inlet end of the sealing run a distance less than the spacing between adjacent sealing jaws on the jaw conveyor means.

14. An apparatus for wrapping articles according to claim 13 wherein said second sensing means is arranged to sense the presence of an article at a location spaced from the inlet end of the sealing run a distance less than twice the spacing between adjacent sealing jaws on the jaw conveyor means.

15. An apparatus for wrapping articles in heat sealable sheet material as they are advanced along an article path comprising, a lower endless type article conveyor means having a plurality of spaced lower sealing jaws extending crosswise the article path and having an upper section extending forwardly along said article path, an upper endless type jaw conveyor means having a plurality of upper sealing jaws extending crosswise of the article path and having a lower section extending forwardly along the article path above the upper section of the article conveyor means to have a sealing run therewith, said upper sealing jaws being spaced apart a distance corresponding to the spacing between the lower jaws and being arranged to move in opposed relation therewith along said sealing run, first and second guides for respectively guiding said upper and lower sealing jaws during movement along said sealing run a distance greater than the spacing between adjacent sealing jaws, means for supporting a curtain of material to extend crosswise of the article path adjacent the inlet end of said article conveyor means, means for advancing articles into said curtain and onto said article conveyor means to draw the curtain along the top and bottom of the article advanced onto the article conveyor means, means for driving the upper and lower conveyor means in timed relation to move the upper and lower jaws forwardly in opposed registry along said sealing runs thereof, sensing means for sensing an article advanced onto said article conveyor means, and guide moving means responsive to said sensing means for relatively moving said first and second guides toward and away from each other between an operating position in which the guides support the upper and lower sealing jaws in clamping arrangement with overlapping portions of a web at the top side of an article during forward movement of the jaws along the sealing run and a release position releasing the upper and lower sealing jaws from clamping engagement with the webs in the absence of an article on the article conveyor means, means on the sealing jaws for severing overlapping portions of the webs and for heat sealing the overlapping portions along opposite sides of the line of severance while the overlapping portions are clamped between the sealing jaws, and means for retracting at least one of said webs after the guides are moved to their release position.

16. An apparatus for wrapping articles according to claim 15 wherein one of the items comprising said first and second guides has an inlet guide section and an outlet guide section, said means for sensing articles including a first sensing means for sensing an article adjacent said inlet guide section and a second sensing means for sensing an article adjacent said outlet guide section, said guide moving means including means operative in the absence of an article adjacent said inlet guide section for moving said inlet guide section to its release position and means operative when both the first and second sensing means sense the absence of an article adjacent both the first and second guide sections for moving both the inlet and outlet guide sections to their release positions.

17. An apparatus according to claim 16 wherein said second guide means includes said inlet and outlet guide sections.

18. An apparatus for wrapping articles according to claim 15 wherein said article conveyor means includes means intermediate adjacent lower sealing jaws movable with said article conveyor means for supporting an article, said lower sealing jaws having their upper faces disposed adjacent the level of the upper side of the article support means on the article conveyor means.

19. An apparatus for wrapping articles according to claim 18 wherein said article support means includes rollers mounted for free axial rotation about axes paralleling the lower sealing jaws.

20. An apparatus for wrapping articles according to claim 18 wherein said upper endless type jaw conveying means is disposed above the tops of the articles as they are moved along the sealing run, the upper sealing jaws being connected to the upper endless conveyor means by elongated arms, said first guide guiding said arms to extend downwardly from the upper endless conveyor means during movement along said sealing run.

21. An apparatus for wrapping articles according to claim 15 wherein said second guide includes an inlet guide section and an outlet guide section, said article sensing means including a first sensing means for sensing an article adjacent said inlet guide section and a second sensing means for sensing an article adjacent said outlet guide section, said guide moving means including means operative in the absence of an article adjacent said first sensing means for moving said first guide section to its release position and means operative in the absence of an article at both said first and second sensing means for moving both said first and second guide sections to their release positions.

22. An apparatus for wrapping articles according to claim 15 wherein said second guide means including inlet and outlet guide sections in end-to-end relation, a first sensing means for sensing an article above said inlet guide section at a first location spaced from the inlet end of the inlet guide section a distance less than the spacing between adjacent sealing jaws on the lower article conveyor mean, a second sensing means for sensing an article above said outlet guide section at a second location spaced from the inlet end of the inlet guide section a distance less than twice the spacing between adjacent sealing jaws on the lower article conveyor means, and means responsive to said first and second sensing means for lowering said first and second guide sections in the absence of an article at said first and second locations.

23. An apparatus for wrapping articles according to claim 15 wherein one of said guides includes endwise aligned inlet and outlet guide sections, said guide moving means including a first cam means for raising and lowering said inlet guide section and a second cam means for raising and lowering said outlet guide section, and first and second operating means for moving said first and second cam means.

24. An apparatus for wrapping articles according to claim 15 wherein said second guide includes endwise aligned inlet and outlet guide sections, said guide moving means including a first cam means connected to said adjacent ends of said inlet and outlet guide sections for raising and lowering said adjacent ends, second and third cam means respectively connected to said inlet and outlet guide sections at locations respectively forwardly and rearwardly from the adjacent ends of the inlet and outlet guide sections to raise and lower the same, and means for operating the several cam means to sequentially lower said inlet guide means and then said outlet guide means as the last article is moved respectively past said inlet and outlet guide sections.

25. An apparatus according to claim 15 including means for delaying retraction of the webs for a time interval after said inlet and outlet guide sections are moved to their release position to allow the heat seal joint to cool below the melting temperature of the material.

* * * * *